US009350204B2

(12) United States Patent
Nakano et al.

(10) Patent No.: US 9,350,204 B2
(45) Date of Patent: May 24, 2016

(54) PERMANENT MAGNET ROTATING ELECTRICAL MACHINE AND ELECTRIC POWER STEERING APPARATUS HAVING A STATOR CORE WITH SUPPLEMENTAL GROOVES

(75) Inventors: Masatsugu Nakano, Tokyo (JP);
Toshihiro Matsunaga, Tokyo (JP);
Kazuhisa Takashima, Tokyo (JP);
Satoru Akutsu, Tokyo (JP); Yusuke Morita, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 918 days.

(21) Appl. No.: 13/390,305

(22) PCT Filed: Nov. 24, 2009

(86) PCT No.: PCT/JP2009/069781
§ 371 (c)(1),
(2), (4) Date: Feb. 13, 2012

(87) PCT Pub. No.: WO2011/064834
PCT Pub. Date: Jun. 3, 2011

(65) Prior Publication Data
US 2012/0139372 A1 Jun. 7, 2012

(51) Int. Cl.
*H02K 1/06* (2006.01)
*H02K 1/26* (2006.01)
(Continued)

(52) U.S. Cl.
CPC .............. *H02K 1/148* (2013.01); *H02K 29/03* (2013.01); *H02K 2213/03* (2013.01)

(58) Field of Classification Search
CPC .................................. H02K 1/27; H02K 21/12
USPC ............... 310/156.47, 216.091–216.092, 310/216.094, 216.069, 216.099
See application file for complete search history.

(56) References Cited

U.S. PATENT DOCUMENTS

2003/0048017 A1* 3/2003 Nakano et al. ................ 310/152
2004/0251763 A1 12/2004 Tamaki et al.
(Continued)

FOREIGN PATENT DOCUMENTS

CN  1574546 A   2/2005
JP  57-051086 U  3/1982
(Continued)

OTHER PUBLICATIONS
Machine Translation JP2009189163 (2008) WO2009084151 (2009) and JP2006230116 (2006).*
(Continued)

*Primary Examiner* — Jose Gonzalez Quinones
(74) *Attorney, Agent, or Firm* — Sughrue Mion, PLLC; Richard C. Turner

(57) ABSTRACT

A compact, light permanent magnet motor with low torque pulsations is obtained by reducing a cogging torque resulting from variations at the end of a rotor, such as an error in attachment position and a variation in magnet characteristic of the permanent magnets. A permanent magnet rotating electrical machine includes a rotor and a stator, a stator core provided with slots in which to store an armature winding wire wound around the teeth, and supplemental grooves provided to the teeth in portions opposing the rotor in an axial direction of the stator core. The supplemental grooves are provided to the stator in a part in the axial direction of the stator core, and that let P be the number of the magnetic poles (the number of poles) and S be the number of the slots (the number of slots), then a relation, $0.75 < S/P < 1.5$, is established.

13 Claims, 24 Drawing Sheets

(51) Int. Cl.
*H02K 1/14* (2006.01)
*H02K 29/03* (2006.01)

(56) References Cited

U.S. PATENT DOCUMENTS

| | | | |
|---|---|---|---|
| 2008/0024028 A1* | 1/2008 | Islam et al. | 310/187 |
| 2008/0054737 A1* | 3/2008 | Inayama et al. | 310/44 |
| 2009/0236920 A1* | 9/2009 | Islam et al. | 310/51 |
| 2010/0244605 A1* | 9/2010 | Nakano et al. | 310/156.01 |
| 2010/0277026 A1 | 11/2010 | Yamaguchi et al. | |

FOREIGN PATENT DOCUMENTS

| | | | |
|---|---|---|---|
| JP | 60-087639 A | | 5/1985 |
| JP | 2001-025182 A | | 1/2001 |
| JP | 2004-135380 A | | 4/2004 |
| JP | 2006-230116 A | | 8/2006 |
| JP | 2006230116 A | * | 8/2006 |
| JP | 2009-177957 A | | 8/2009 |
| JP | 2009-177957 A | | 8/2009 |
| JP | 2009-189163 A | | 8/2009 |
| JP | 2009-189163 A | | 8/2009 |
| JP | 2009189163 A | * | 8/2009 |
| WO | WO 2009/084151 A1 | | 7/2009 |
| WO | WO 2009084151 A1 | * | 7/2009 |

OTHER PUBLICATIONS

Chinese Office Action, issued Jan. 16, 2014, Patent Application No. 200980162467.3

* cited by examiner

THE INVENTION

PERMANENT MAGNET ROTATING ELECTRICAL MACHINE AND ELECTRIC POWER STEERING APPARATUS HAVING A STATOR CORE WITH SUPPLEMENTAL GROOVES

CROSS REFERENCE TO RELATED APPLICATIONS

This application is a National Stage of International Application No. PCT/JP2009/069781 filed Nov. 24, 2009, the contents of all of which are incorporated herein by reference in their entirety.

TECHNICAL FIELD

The present invention relates to a permanent magnet rotating electrical machine having a rotor provided with permanent magnets and to an electric power steering apparatus using the same.

BACKGROUND ART

Recently, a motor with a small cogging torque is required in diverse applications. Examples include industrial-level servo motors and elevator winches. When attention is focused on such applications for vehicle, an electrical power steering apparatus is in widespread use for the purpose of achieving better fuel consumption and better steering performance. In the case of a motor used in the electrical power steering apparatus, because a cogging torque is transmitted to a driver via a gear, there is a strong demand for a cogging torque reduction of the motor in order to obtain a smooth steering feeling. To satisfy such a demand, there is a method of providing supplemental grooves in an iron core of a stator as a method of reducing a cogging torque as described, for example, in Patent Documents 1, 2, and 3.

PRIOR ART DOCUMENTS

Patent Documents

Patent Document 1: JP-A-2001-25812
Patent Document 2: JP-T-2006-230116
Patent Document 3: WO2009/84151
The term, "JP-T" as used herein means a published Japanese translation of a PCT patent application.

SUMMARY OF THE INVENTION

Problems that the Invention is to Solve

According to a permanent magnet rotating electrical machine of Patent Document 1, because the supplemental grooves are provided entirely in an axial direction of the motor, an equivalent air gap length becomes longer and there arises a problem that a torque is reduced. Also, it is all in common with Patent Documents 1, 2, and 3 that the disclosed methods are effective in reducing a cogging torque that pulsates as many times as the least common multiple of the number of poles and the number of slots or an integral multiple thereof whereas the disclosed methods have a problem that it is impossible to sufficiently suppress a cogging torque component (component that pulsates as many times as the number of slots per rotation of the rotor) generated by variations at the end of the rotor, such as an error in attachment position, an error in shape, and a variation in magnetic characteristic of the permanent magnets.

The invention is devised to solve the problems discussed above and has an object to obtain a permanent magnet rotating electrical machine achieving both of a cogging torque reduction and a high torque while reducing a size.

Means for Solving the Problems

A permanent magnet rotating electrical machine of the invention includes a rotor having a rotor core and plural magnetic poles formed of permanent magnets provided to the rotor core, and a stator having plural teeth opposing the plural magnetic poles, a stator core provided with slots in which to store an armature winding wire wound around the teeth, and supplemental grooves provided to the teeth in portions opposing the rotor in an axial direction of the stator core. The permanent magnet rotating electrical machine is configured in such a manner that the supplemental grooves are provided to the stator in a part in the axial direction of the stator core, and that let P be the number of the magnetic poles (the number of poles) and S be the number of the slots (the number of slots), then a relation,
0.75<S/P<1.5, is established.

Advantage of the Invention

According to the invention, there can be achieved a significant advantage that it becomes possible to obtain a compact, light permanent magnet rotating electrical machine with low torque pulsations by reducing a cogging torque resulting from variations at the end of the rotor, such as an error in attachment position and a variation in magnet characteristic of the permanent magnets.

MODES FOR CARRYING OUT THE INVENTION

Hereinafter, preferred embodiments of a permanent magnet rotating electrical machine of the invention will be described using the drawings.

First Embodiment

Figure 1:
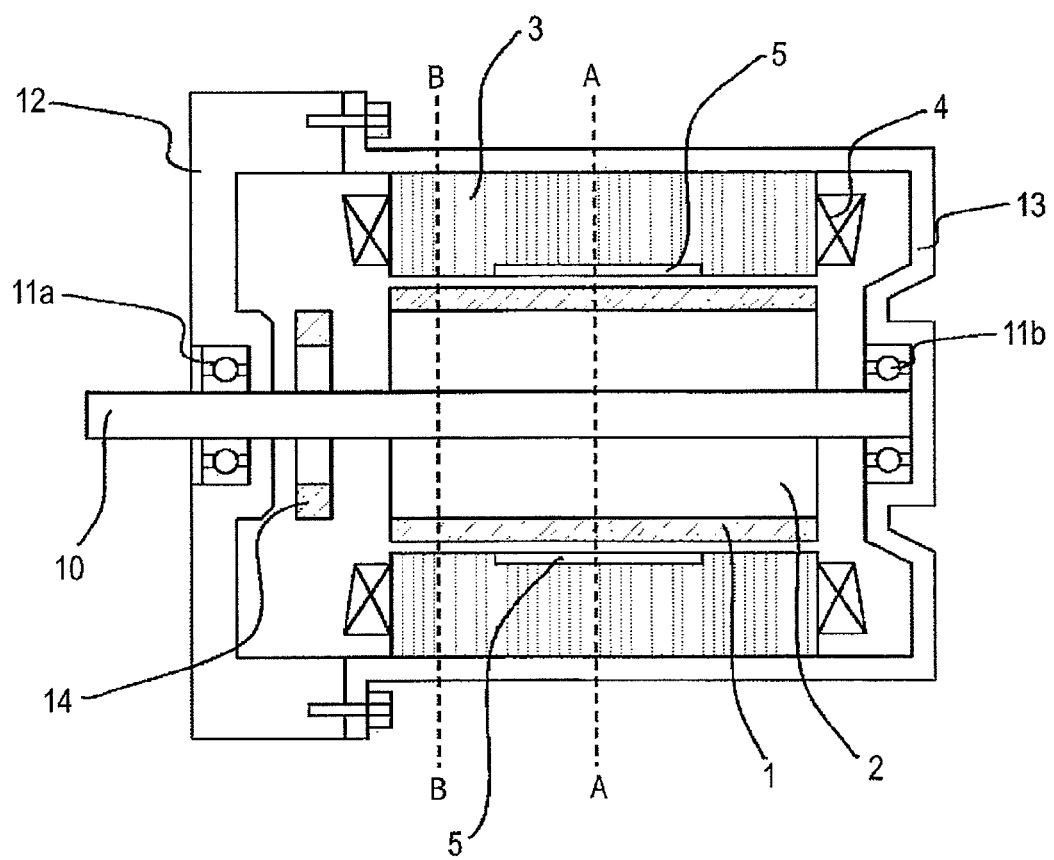
FIG. 1 is a cross section of a permanent magnet rotating electrical machine according to a first embodiment of the invention.

FIG. 1 is a cross section of a permanent magnet rotating electrical machine of a first embodiment on a plane parallel to a rotation axis. Permanent magnets 1 are provided to a surface of a rotor core 2. A rotation shaft 10 is press-fit in the rotor core 2 and it is configured in such a manner that a rotor is allowed to rotate by bearings 11a and 11b. A rotation angle sensor 14 to detect an angle of rotation is also provided to the rotor. The rotation angle sensor 14 is formed, for example, of a resolver or a hall effect sensor and a magnet or an encoder.

A stator core 3 is provided oppositely to the permanent magnets 1. The stator core can be formed, for example, by laminating magnetic steel sheets or of a dust core. An armature winding wire 4 is wound around the stator core 3. A stator is fixed to a frame 13 by press-fitting or shrink-fitting. Further, the frame 13 is fixed to a housing 12.

Supplemental grooves 5 for cogging torque reduction are provided to the stator core 3 in a portion opposing the permanent magnets 1. Further, the supplemental grooves 5 are provided in a part in a direction of the rotation axis. In FIG. 1, the supplemental grooves 5 are provided to the stator core in the vicinity of the center in the direction of the rotation axis and are not provided in axial end portions.

Figure 2:
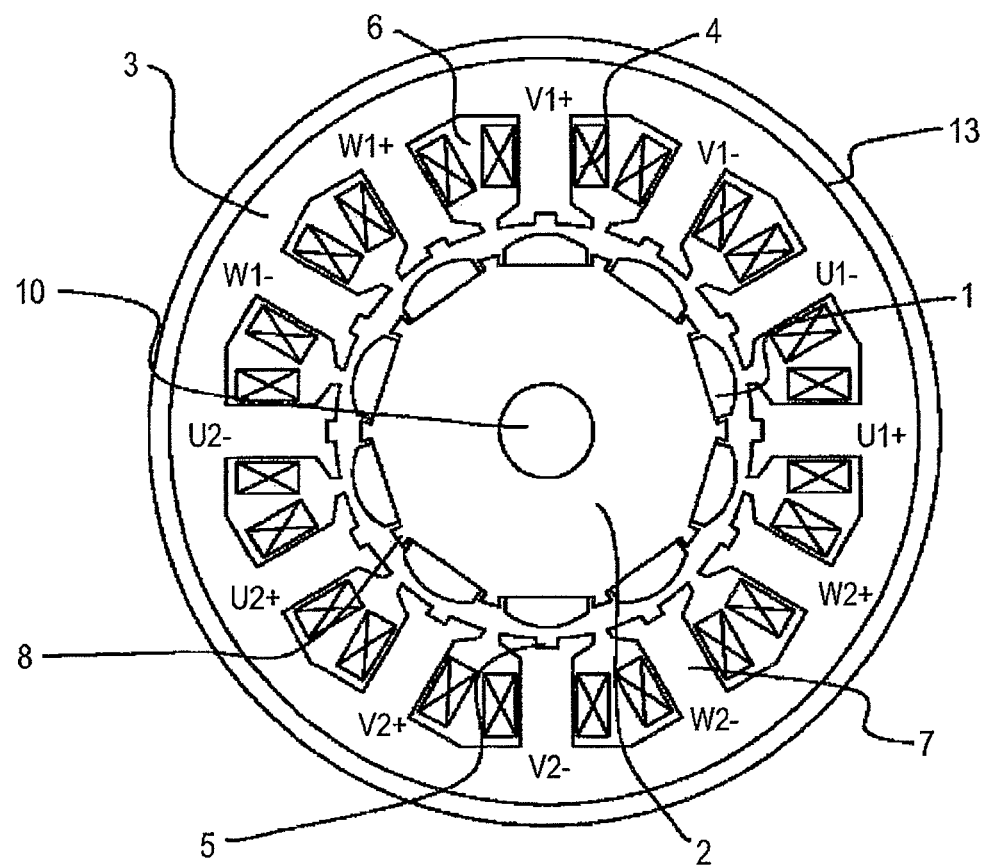
FIG. 2 is a cross section taken along line A-A of FIG. 1.
Figure 3:
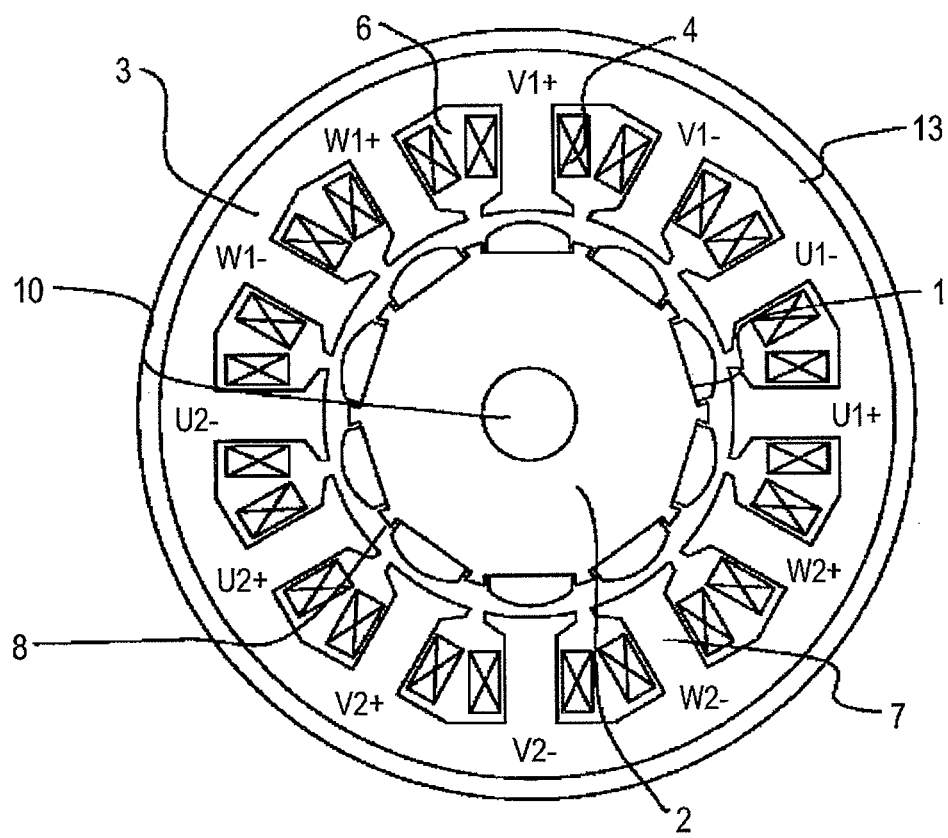
FIG. 3 is a cross section taken along line B-B of FIG. 1.

FIG. 2 and FIG. 3 are used to describe this configuration more in detail. FIG. 2 is a cross section taken along line A-A of FIG. 1 perpendicularly to the rotation shaft 10. This is a cross section in a portion in which the supplemental grooves 5 are provided. The permanent magnets 1 are attached to the surface of the rotor core 2 and the number of poles is 10 in this example. Further, the permanent magnets 1 have a cross section of a barrel shape and reduce torque pulsations by reducing a harmonic component of a magnetic flux and thereby shaping an inductive voltage into a sinusoidal waveform. Protrusions 8 are provided to the rotor core and serve to fix the permanent magnets 1 not to slide in a circumference direction.

Meanwhile, slots 6 used to wind the armature winding wire 4 around the stator core 3 are provided in the stator. In the example of FIG. 2, the armature winding wire 4 is intensively wound around teeth 7 extending in a radial direction of the stator core 3. Herein, the number of slots is 12 and the armature winding wire 4 is wound around all of the 12 teeth 7. Further, the number of phases of the permanent magnet rotating electrical machine is three. Let these phases be a U phase, a V phase, and a W phase. Then, the winding configuration is, as is shown in FIG. 2, U1+, U1−, V1−, V1+, W1+, W1−, U2−, U2+, V2+, V2−, W2−, and W2+. Herein, + and − signs indicate winding directions and the + and − signs indicate that the winding directions are opposite to each other. Further, U1+ and U1− are connected in series and U2− and U2+ are also connected in series. These two series circuits may be connected in parallel or in series. The same can be said with the V phase and the W phase. Moreover, the three phases may be connected by a Y connection or a delta connection.

In comparison with a permanent magnet rotating electrical machine having a combination, the number of poles:the number of slots=2:3 or 4:3, the permanent magnet rotating electrical machine having 10 poles and 12 slots is a compact high-torque rotating electrical machine having a large winding factor. Further, the least common multiple of the number of poles and the number of slots is large and there is a tendency that a component in a cogging torque pulsating as many times as the least common multiple per rotation of the rotor becomes small. However, there is a problem that a cogging torque 12'th-order component, which is generated by variations at the end of the rotor, such as an error in attachment position, an error in shape, and a variation in magnetic characteristic of the permanent magnets 1, appears noticeably. Although it will be described in detail below, the invention is devised to solve this problem.

Referring to FIG. 2, the teeth 7 of the stator are shaped in such a manner that a tip end, that is, a portion opposing the rotor, extends in the circumference direction and openings of the slots 6 are made smaller than portions in which the armature winding wire 4 is stored. Further, one supplemental groove 5 is provided to one tooth 7 on a surface of the tooth opposing the rotor. In addition, a position of the supplemental groove 5 in the circumference direction coincides with a center of the tooth 7 in the circumference direction.

FIG. 3 is a cross section taken along line B-B of FIG. 1 perpendicularly to the rotation shaft 10. This is a cross section in a portion in which the supplemental grooves 5 are not provided. In comparison with FIG. 2, it is different in configuration that there are no supplementary grooves 5 and the rest is of the same structure.

Figure 4:
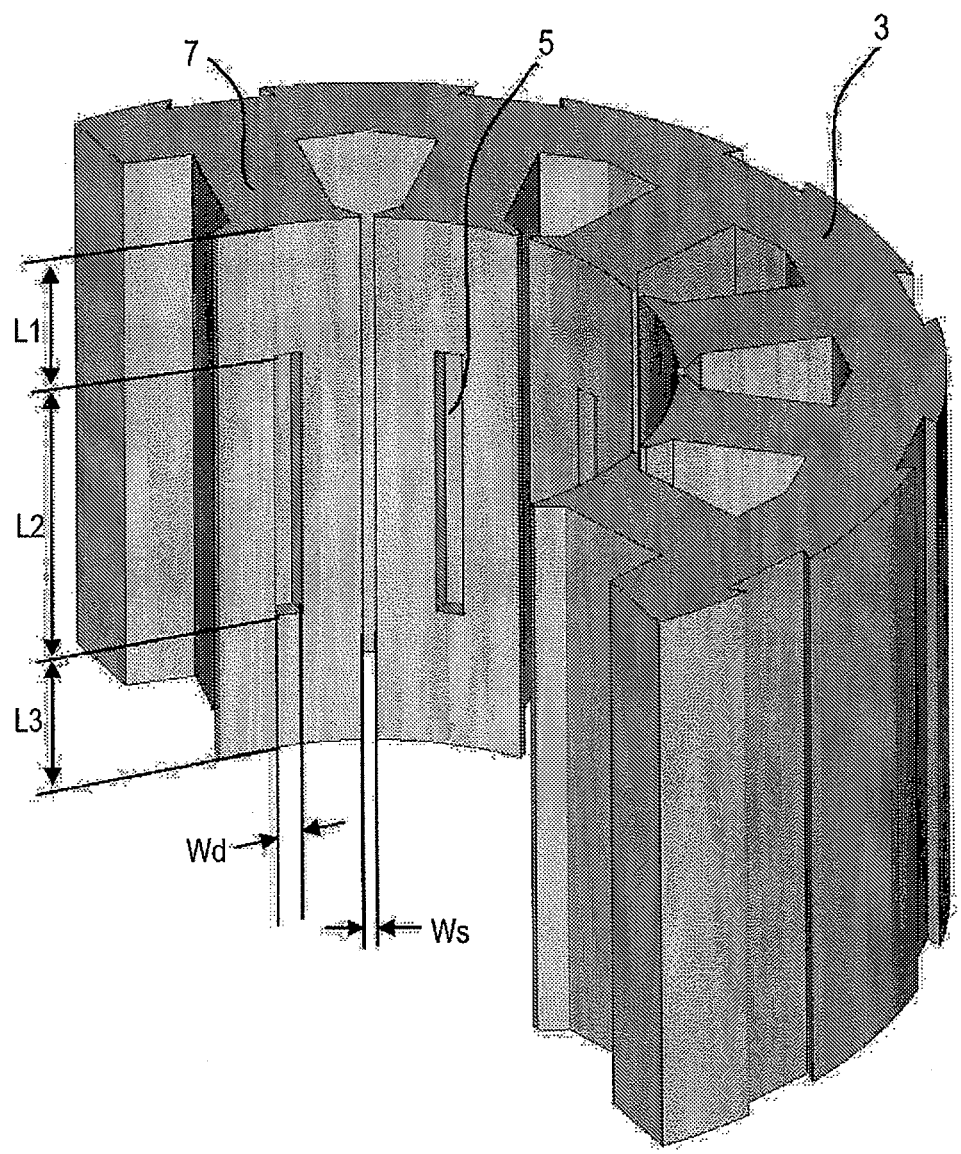
FIG. 4 is a partial perspective view of a stator core of the first embodiment.

FIG. 4 is a partial perspective view for ease of understanding of the configuration of the supplemental grooves 5. Herein, the stator core 3 alone is shown and the other components are omitted for simplicity. Further, only one half, that is, six teeth out of the 12 teeth are shown for better view of the portion opposing the rotor. The supplemental grooves 5 are provided in the vicinity of the center in the direction of the rotation axis and are not provided in the end portions. More specifically, the supplemental grooves 5 are not provided in a portion having a length L1 from the end portion (top in FIG. 4) in the direction of the rotation axis. The supplemental grooves 5 are provided across a portion below having a length of L2. Further, the supplemental grooves 5 are not provided in a portion below having a length of L3.

When configured as above, it becomes possible to suppress a cogging torque component generated by variations at the end of the rotor, such as an error in attachment position, an error in shape, and a variation in magnetic characteristic of the permanent magnets 1. The underlying principle will be described in the following.

Figure 6:
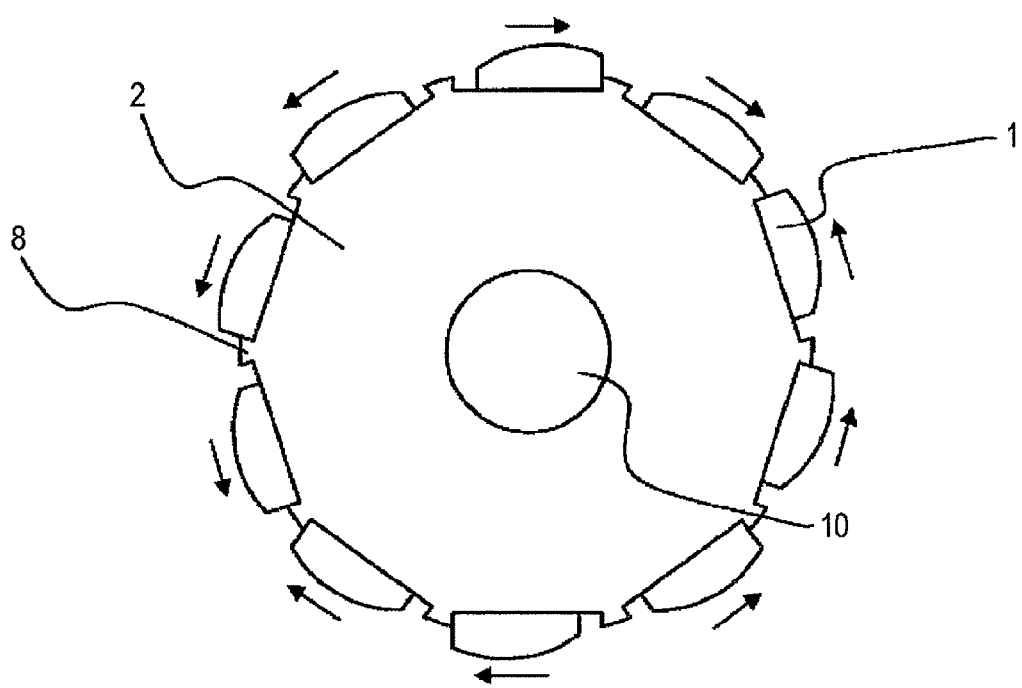
FIG. 6 is a cross section of a rotor of the first embodiment.

The ten permanent magnets 1 on the rotor in FIG. 2 show an example where attachment positions are equally spaced apart and all the ten permanent magnets 1 have the same cross sectional shape. Variations in manufacturing, however, occur in an actual machine. For example, there may be a case where the attachment positions are not equally spaced apart and displaced by about several μm to 100 μm in the circumference direction no matter how accurately the permanent magnets 1 are attached. Meanwhile, it is also anticipated that the cross sections are not of an ideal symmetrical shape and a thickness increases on the right or left side and decreases on the other side. FIG. 6 shows an example of such a state. FIG. 6 shows that the attachment positions of the permanent magnets 1 are displaced from the ideal equally-spaced positions in directions indicated by arrows. Further, it is shown that the cross sectional shapes are not symmetric. The apices of barrel shapes shift in the directions indicated by the arrows and the cross sections become asymmetric. In an ideal state in the absence of variations in manufacturing, a component that pulsates as many times as the least common multiple of the number of poles and the number of slots per rotation of the rotor is chiefly generated in a cogging torque. However, when the rotor is in a state as shown in FIG. 6 because of variations in manufacturing, a cogging torque is increased and a component that pulsates as many times as the number of slots per rotation of the rotor appears.

Figure 7:
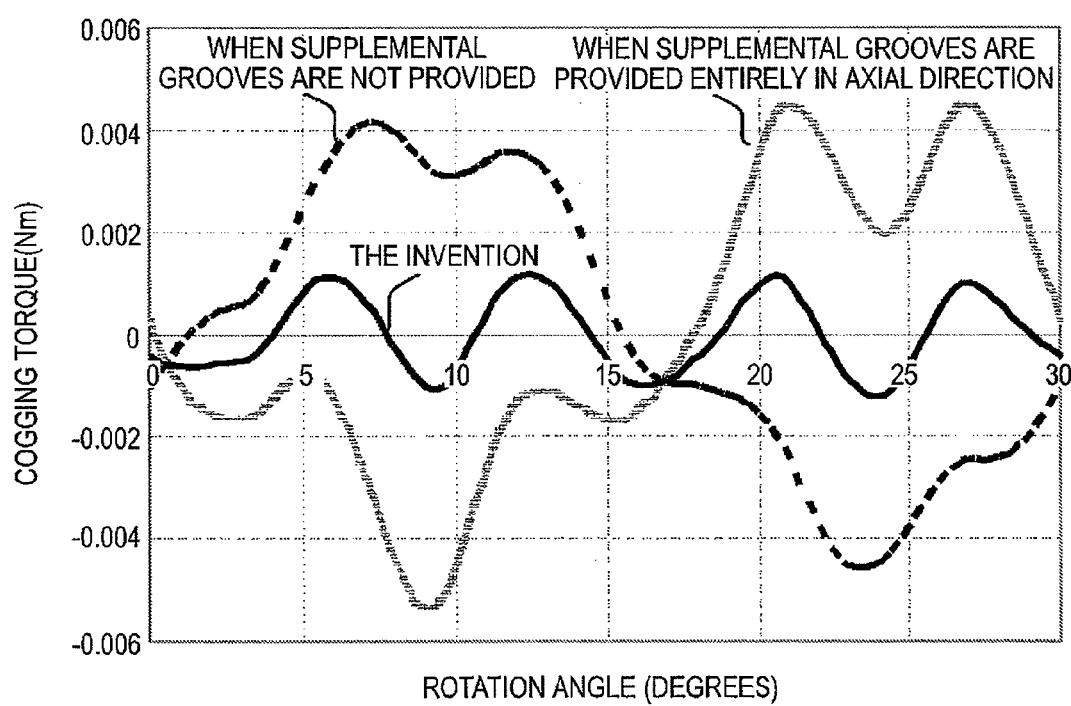
FIG. 7 is a view used to describe a cogging torque waveform of the first embodiment.

In the example of this embodiment, because the number of slots is 12, a cogging torque appears 12 times per rotation of the rotor, that is, once in every 360 degrees/12=30 degrees in mechanical angle. FIG. 7 is a view showing waveforms of a cogging torque for 30 degrees (mechanical angle). A cogging torque waveform in a case where the supplemental grooves 5 are not provided is indicated by a dotted line and it can be understood that a cogging torque appears noticeably in every 30 degrees. Also, it is understood that a cogging torque appears noticeably in every 30 degrees from a cogging torque waveform in a case where one supplemental groove 5 is provided entirely in the axial direction. It should be noted, however, that the phases are inverted from those in the case where the supplemental grooves 5 are not provided. Accordingly, it can be understood that a cogging torque can be reduced by combining the both waveforms. Hence, by configuring in such a manner that one supplemental groove 5 is provided per tooth to the stator core 3 in a portion in the direction of the rotation axis, a cogging torque of the permanent magnet rotating electrical machine is found to be a sum of a cogging torques generated in a portion in which the supplemental grooves 5 are not provided and a cogging torque generated in a portion in which the supplemental grooves 5 are provided. Hence, it is predicted that there can be achieved an effect of cancelling a cogging torque appearing in every 30 degrees and the cogging torque can be reduced markedly.

A cogging torque waveform in the case of the configuration as shown in FIG. 4 in which the supplemental grooves 5 are provided in a part in the direction of the rotation axis is shown in FIG. 7 by a solid line (the invention). It is understood that a cogging torque appearing in every 30 degrees is reduced markedly and, as a result, a p-p value of the cogging torque becomes markedly small.

Figure 8:
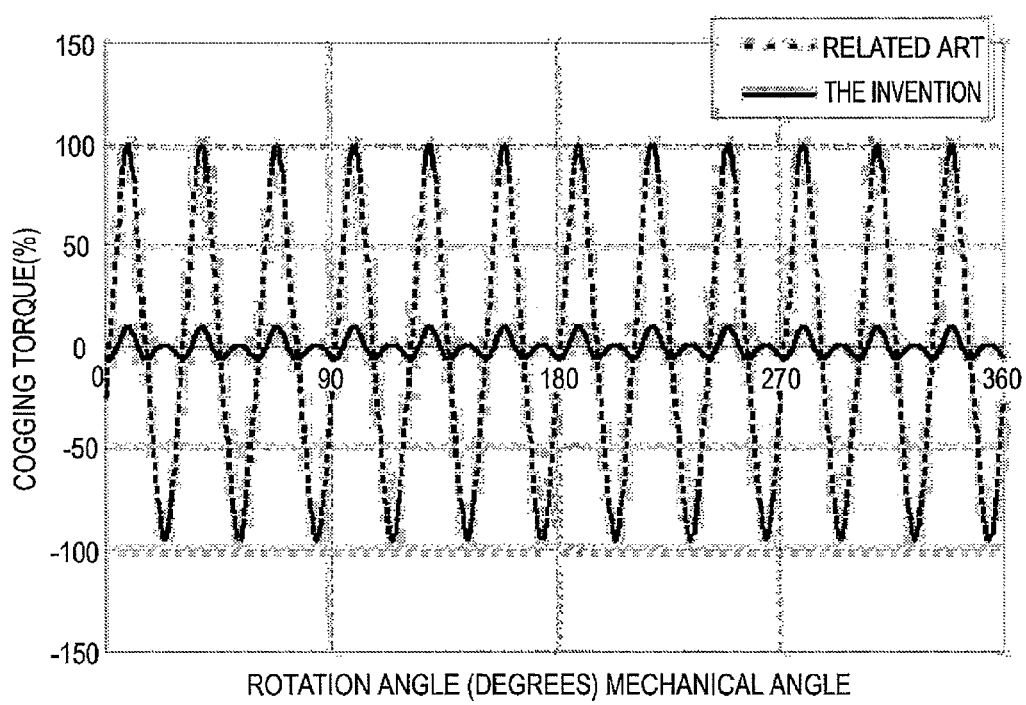
FIG. 8 is a view used to describe a cogging torque waveform of the first embodiment.

FIG. 8 shows a cogging torque waveform per rotation of the rotor (for the mechanical angle of 360 degrees) in comparison with that of the related art. Herein, the maximum value of a cogging torque in the related art is standardized at 100%. It is understood that at the occurrence of variations in manufacturing in the rotor, a component that pulsates 12 times per rotation of the rotor is generated considerably in the related art whereas this component is reduced markedly with the configuration of the invention. The p-p value is reduced to merely ⅒ of that of the related art.

Figure 9:
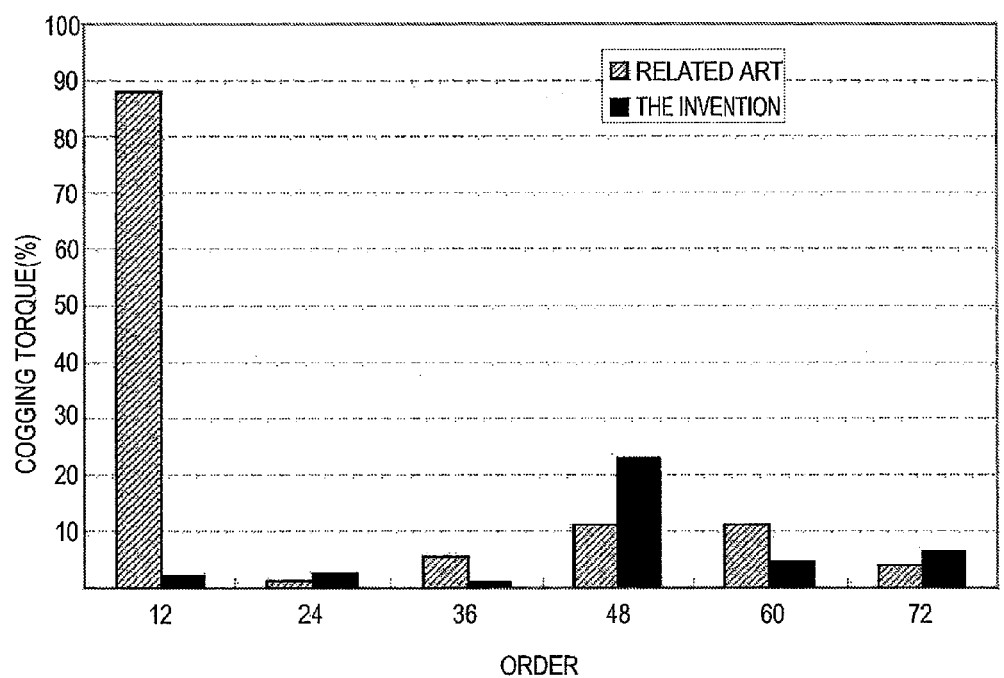
FIG. 9 is a view used to describe order components of a cogging torque of the first embodiment.

FIG. 9 shows a frequency component of the cogging torque of FIG. 8. Herein, one rotation of the rotor is given as one order. It is confirmed that a 12'th-order component, that is, a component that pulsates as many times as the number of slots becomes markedly small. It is therefore understood that a cogging torque resulting from variations at the end of the rotor can be reduced markedly by adopting the configuration of this embodiment.

Figure 10A:
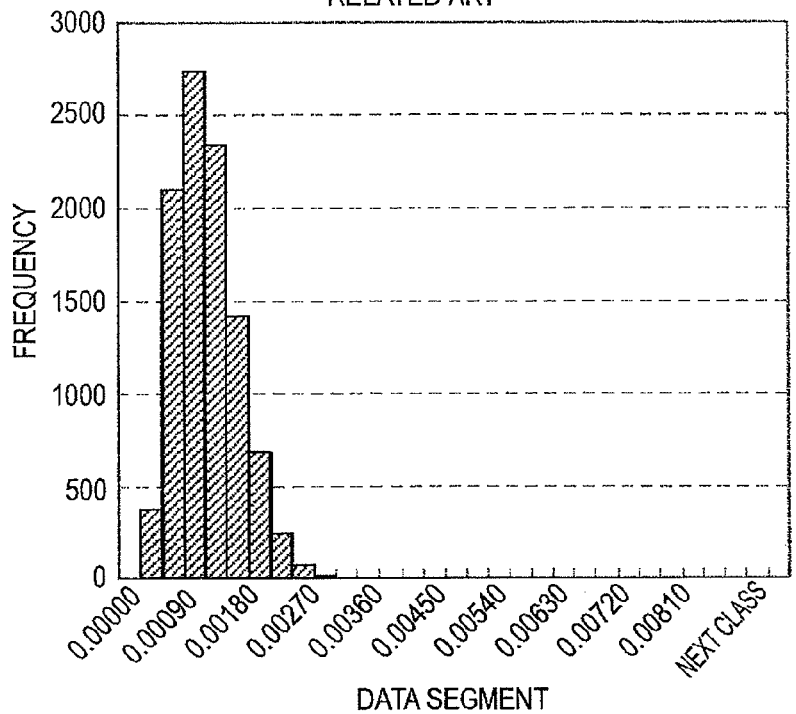
FIG. 10 is a view used to describe a histogram of a cogging torque of the first embodiment.
Figure 10B:
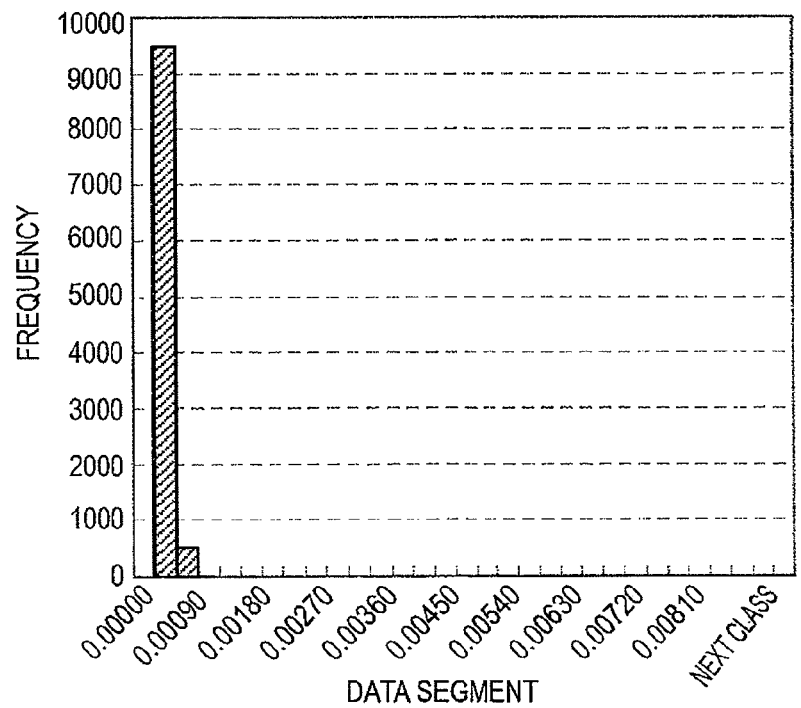

The above has described a case where a pattern of variations at the end of the rotor is as shown in FIG. 6. In order to verify the advantage of the invention, a histogram is created for cogging torques in a total of 10,000 rotating electrical machines on the assumption that random variations occur in each of the ten permanent magnets 1. The result is set forth in FIG. 10. FIG. 10(a) shows a histogram of the related art and FIG. 10(b) shows a histogram of the configuration of FIG. 4 (the invention). A comparison is made on the assumption that variation conditions at the end of the rotor are the same. In the case of FIG. 10(a), a cogging torque is distributed widely and therefore there is a problem that a cogging torque becomes large depending on variation patterns. On the contrary, it is understood that a cogging torque is small with the configuration of the invention independently of the variation patterns of the permanent magnets 1 at the end of the rotor.

In short, it becomes possible to obtain a permanent magnet rotating electrical machine that is highly robust against variations in manufacturing at the end of the rotor. The configuration of the supplemental grooves in the related art is aimed at achieving an effect of reducing a component that pulsates as many times as the least common multiple of the number of poles and the number of slots per rotation of the rotor, and therefore cannot obtain a sufficient reducing effect for a component generated by variations at the end of the rotor (a component that pulsates as many times as the number of slots).

Figure 5:
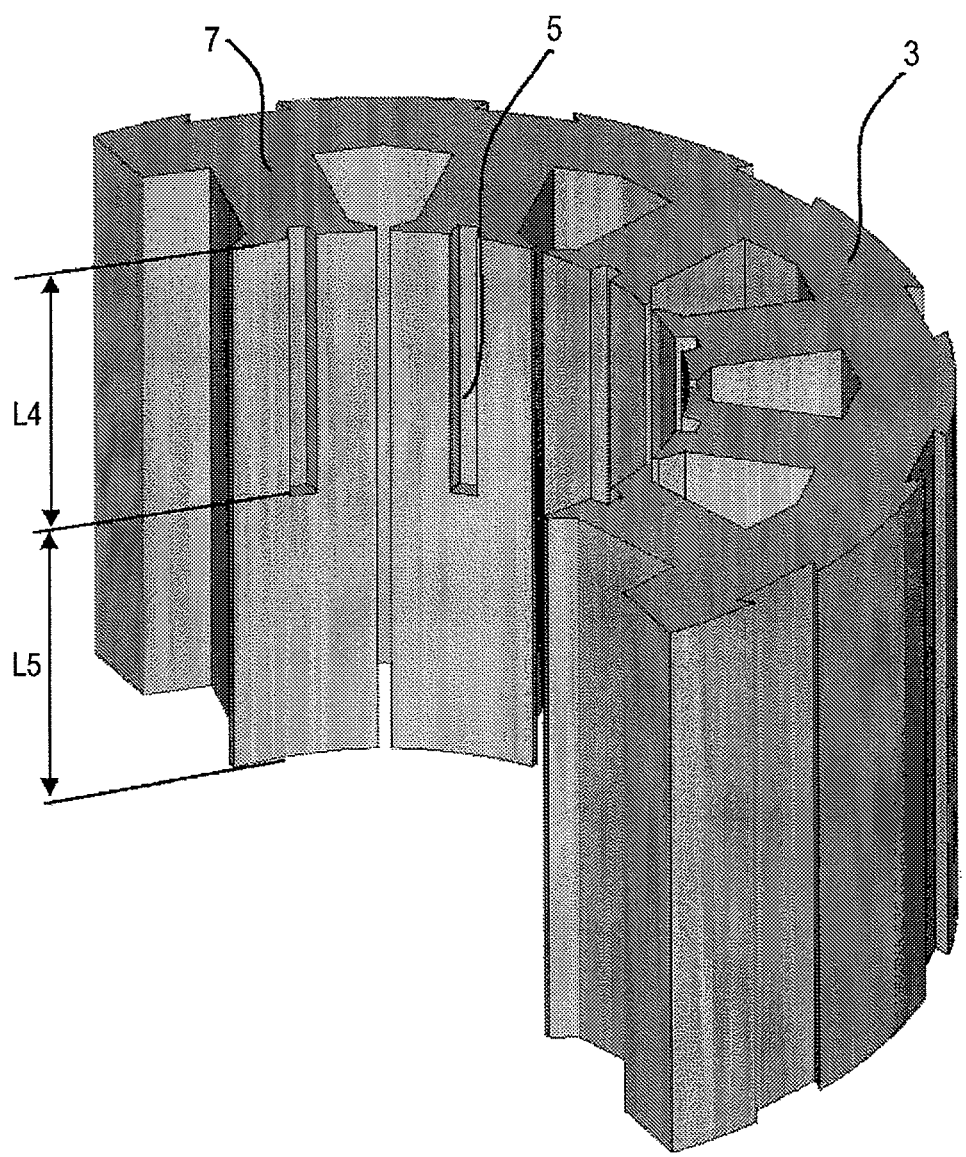
FIG. 5 is a partial perspective view of another example of the stator core of the first embodiment.

FIG. 5 shows a structure different from that of FIG. 4. It should be noted, however, that the stator core 3 alone is shown and the other components are omitted for simplicity. Further, only one half, that is six teeth 7 out of the 12 teeth 7 are shown for better view of the portion opposing the rotor. The supplemental grooves 5 are provided on the upper part in the direction of the rotation axis and are not provided on the lower part. More specifically, the supplemental grooves 5 are provided in a portion having a length L4 from the end portion (the top in FIG. 5) in the direction of the rotation axis. The supplemental grooves 5 are not provided in a portion below having a length L5. Even when configured in this manner, as with the configuration of FIG. 4, there can be achieved an effect for a cogging torque generated in every 30 degrees by variations in the rotor that a cogging torque generated in the portion having the length L4 and a cogging torque generated in the portion having the length L5 cancel out each other. Consequently, it becomes possible to obtain a permanent magnet rotating electrical machine that is highly robust against variations in manufacturing at the end of the rotor.

Figure 11:
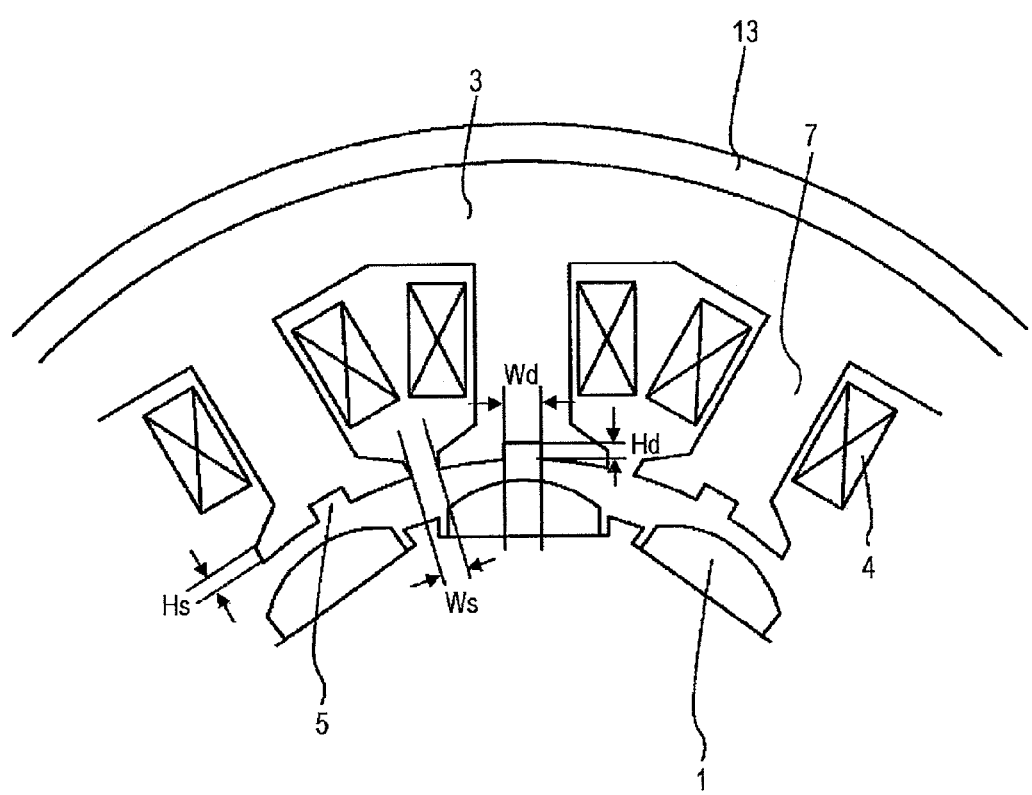
FIG. 11 is a view used to describe dimensions of supplemental grooves and slot openings of the first embodiment.
Figure 12:
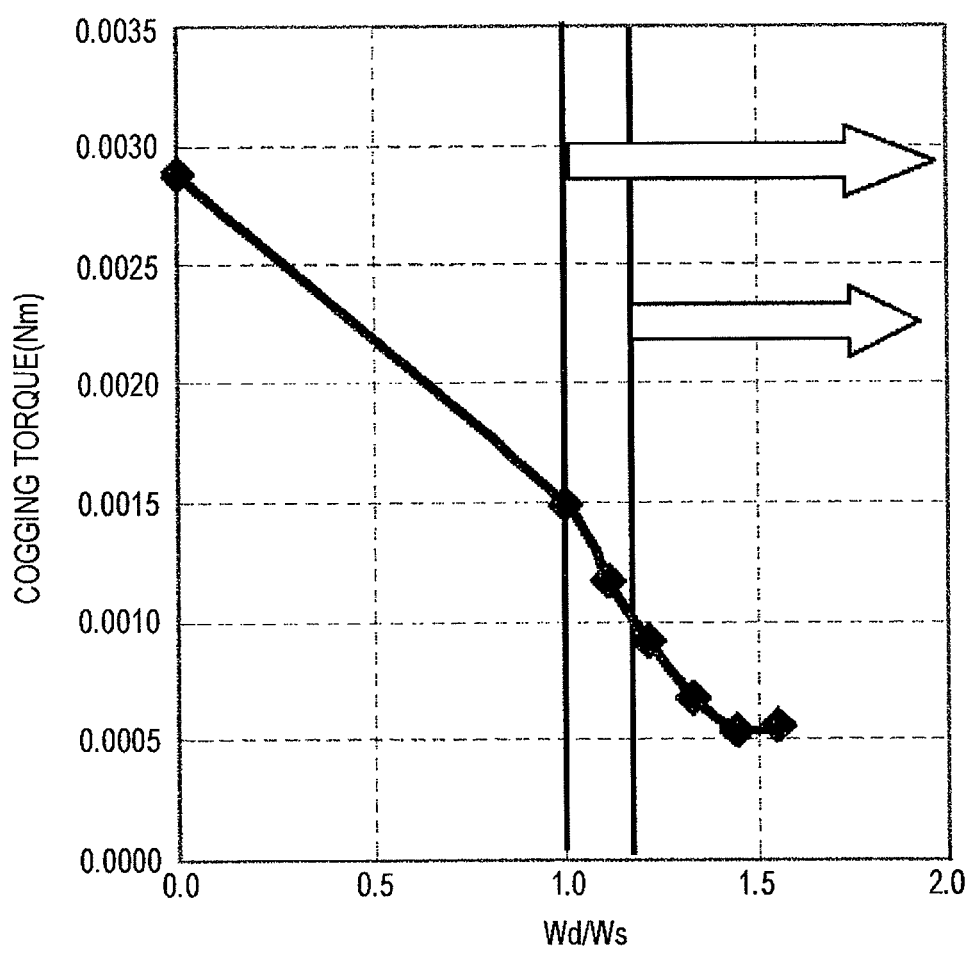
FIG. 12 is a view used to describe a relation between a width of the supplemental grooves and a cogging torque of the first embodiment.

A shape of the supplemental grooves 5 will now be described. FIG. 11 is a view used to describe a width of the supplemental grooves 5, Wd, a depth of the supplemental grooves 5, Hd, a width of a slot opening, Ws, and a height of a tooth tip end, Hs. According to the structure of the invention, the cancelling effect is obtained by inverting phases of a cogging torque component that pulsates as many times as the number of slots between the portion in which the supplemental grooves 5 are provided and the portion in which the supplemental grooves 5 are not provided. Accordingly, selection of a shape of the supplemental grooves 5 has an influence on the greatness of the effect. FIG. 12 shows a graph in which the abscissa is used for a ratio of the width of the supplemental grooves 5, Wd, with respect to the width of the slot opening, Ws, and the ordinate is used for an O.A. value of a cogging torque at the occurrence of variations in the rotor. In comparison with a case where Wd/Ws=0 is given, that is, where the supplemental grooves 5 are not provided, in a case where Wd/Ws≥1.0 is given, a cogging torque is reduced to ½ or less of that in the case where the supplemental grooves 5 are not provided. Further, in a case where Wd/Ws≥1.25 is given, a cogging torque is reduced to a value as extremely small as 0.001 Nm. When a cogging torque resulting from variations in the rotor is suppressed to this level, for example, in a case where the rotating electrical machine is incorporated into an electric power steering apparatus described below, there can be achieved an advantage that the driver can have a satisfactory steering feeling without sensing a cogging torque.

When Wd/Ws≥1.0 is given, it becomes possible to invert the phases of a cogging torque component that pulsates as many times as the number of slots by changing a pulsation component of permeance by the slots in the stator core. Hence, this cogging torque and a cogging torque in a portion in which the supplemental grooves 5 are not provided can cancel out each other. In a case where one supplemental groove 5 is provided to one tooth, by giving Wd/Ws≥1.0, and in a case where two or more supplemental grooves 5 are provided, by giving Wd/Ws≥1.0, where Wd is a sum of widths of all the supplemental grooves 5 provided to the tooth, the same advantage can be achieved.

Further, it is preferable that the depth of the supplemental grooves 5, Hd, is greater than the thickness of the tooth tip end, Hs. When configured in this manner, it also becomes possible to invert the phases of a cogging torque component that pulsates as many times as the number of slots by changing a pulsation component of permeance by the slots in the stator core. Hence, the cancelling effect with a cogging torque in a portion in which the supplemental grooves 5 are not provided as described above can be exerted sufficiently.

Figure 13:
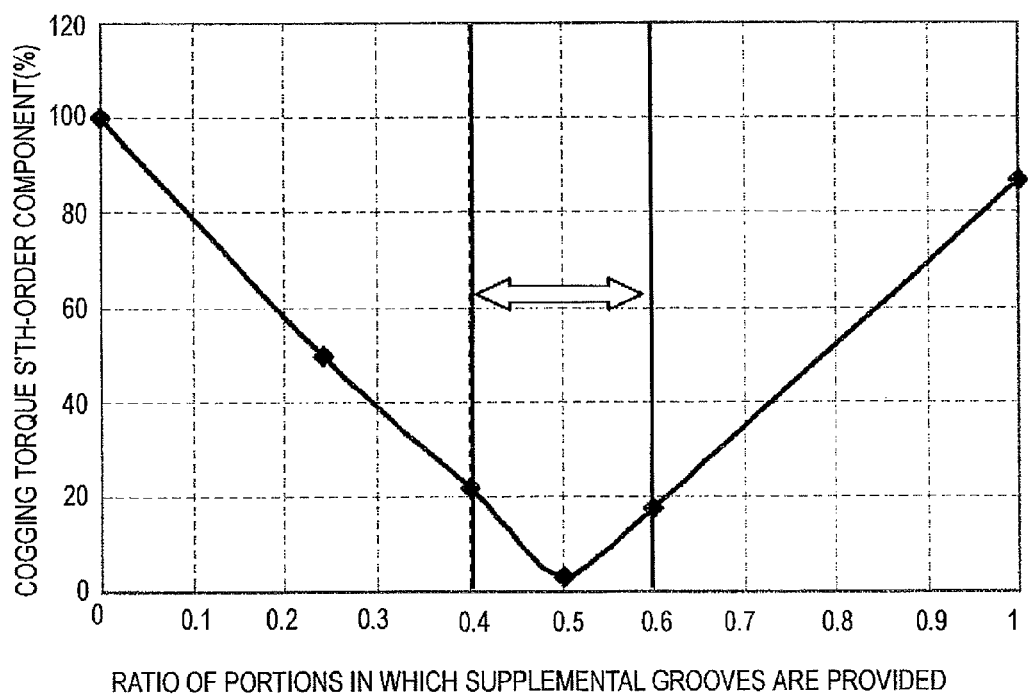
FIG. 13 is a view used to describe a relation between a ratio of portions provided with the supplemental grooves and a cogging torque S'th-order component of the first embodiment.

A range in which to provide the supplemental grooves 5 will now be discussed. Let S (S is an integer and S=12 in this embodiment) be the number of slots in the stator core 3, and a cogging torque component that pulsates as many times as the number of slots per rotation of the rotor is referred to as the cogging torque S'th-order component. FIG. 13 shows the result of a simulation as to how the cogging torque S'th-order component varies with a range in which to provide the supplemental grooves 5 in the direction of the rotation axis. The ordinate is used for the cogging torque S'th-order component and the cogging torque S'th-order in a case where the supplemental grooves 5 are not provided is standardized at 100%. The abscissa is used for a ratio of a total Ld of lengths of portions in which the supplemental grooves 5 are provided in the direction of the rotation axis with respect to a length of the stator core, Lc, in the direction of the rotation axis, that is, Ld/Lc. In the case of FIG. 4, Ld/Lc=L2/(L1+L2+L3) and in the case of FIG. 5, Ld/Lc=L4/(L4+L5).

It is understood that the cogging torque S'th-order component takes the minimum value when Ld/Lc=0.5 and can be reduced to about ⅓ of that in the case of the configuration in which the supplemental grooves 5 are not provided (Ld/Lc=0) or in a case where the supplemental grooves 5 are provided entirely in the direction of the rotation axis (when Ld/Lc=1) when 0.4≤Ld/Lc≤0.6.

In view of the foregoing, it can be understood that let Lc be the axial length of the stator core and Ld be the axial length of a portion in which the supplemental grooves 5 are provided, then by providing a characteristic that Lc and Ld satisfy a relational expression, 0.4≤Ld/Lc≤0.6, and desirably Ld/Lc=0.5, the cancelling effect of cogging torques in a portion in which the supplemental grooves 5 are provided and a portion in which the supplemental grooves 5 are not provided is exerted sufficiently, thereby achieving an advantage of markedly reducing a cogging torque component generated by variations at the end of the rotor.

In the example of FIG. 4, it is structured in such a manner that the supplemental grooves 5 are provided to the stator core 3 in the vicinity of the center in the direction of the rotation axis. A special effect achieved by this structure will now be described. In the configuration of FIG. 4, the supplemental grooves 5 are not provided in the axial end portions of the stator core 3. However, in a case where the supplemental grooves 5 are provided in the axial end portion, a portion having a large gap from the rotor increases in the axial end portions. This means that there is a large clearance in which foreign matter enters. When foreign mater enters into the clearance, the rotor may possibly be locked. When locked, the rotor becomes immovable. This state is not desirable, particularly, in the electric power steering apparatus, because the driver becomes unable to steer. Accordingly, by adopting the structure in which the supplemental grooves 5 are provided in the vicinity of the center in the direction of the rotation axis, there can be achieved a greater effect of preventing entry of foreign matter than in a case where the supplemental grooves 5 are provided in the axial end portion as in FIG. 5.

Figure 14:
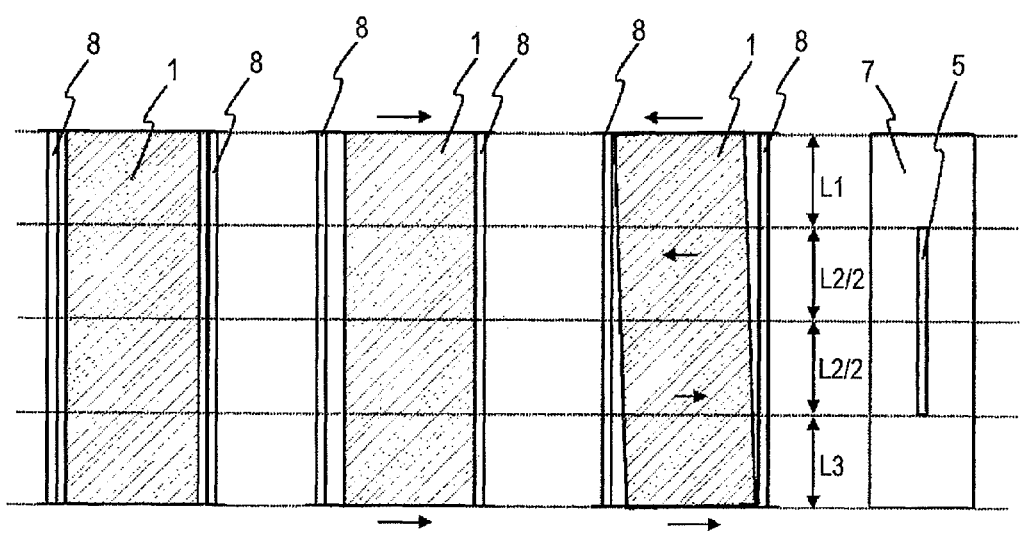
FIG. 14 is a view used to describe an example of positional displacement of a permanent magnet of the first embodiment.

Besides the effect of preventing entry of foreign matter as described above, there is an effect advantageous in terms of magnetic circuits as described in the following. When an error occurs in attachment position of the permanent magnets 1, it is anticipated that there are cases where an error, that is, a manner of displacement, is uniform and where an error is not uniform in the direction of the rotation axis of the rotor. FIG. 14 shows states of positional displacement of the permanent magnet 1 and a positional relation between the permanent magnet 1 and the supplemental groove 5. FIGS. 14(a), 14(b), and 14(c) show one permanent magnet 1 and the protrusions 8 provided on the both sides. Regarding the magnetic poles of the rotor in these cases, one magnetic pole is formed of one segment magnet. A top-bottom direction and a left-right direction on the sheet surface are the direction in the rotation axis and the circumference direction, respectively.

FIG. 14(d) is a view of the tooth tip end of the stator core 3 when viewed from the rotor side. There are portions in which the supplemental groove 5 is provided and portions in which the supplemental groove 5 is not provided and this configuration corresponds to the configuration of FIG. 4. In the case of FIG. 14(a), no cogging torque S'th-order component appears because the permanent magnet 1 is located at an ideal position. In contrast, the cogging torque S'th-order component is generated when the position is displaced as is shown in FIG. 14(b). However, the cogging torque S'th-order components in a region having a length L1 and a region having a length L3 (regions in which the supplemental grooves 5 are not provided) and in regions having a length L2 (=L2/2+L2/2) (regions in which the supplemental grooves 5 are provided) shown in FIG. 14(d) are cancel out each other. Hence, the S'th-order component hardly appears in a total cogging torque.

Figure 15:
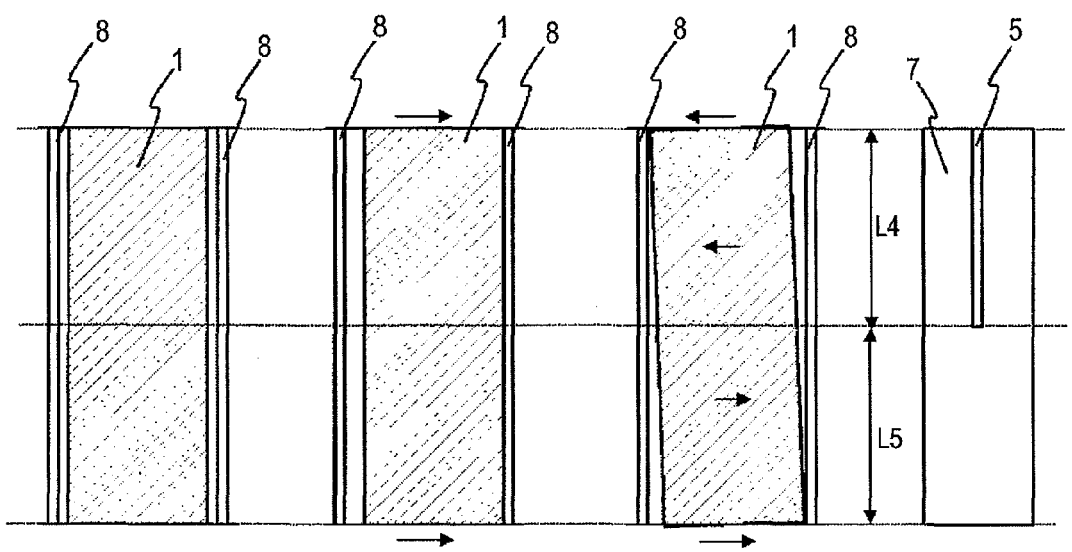
FIG. 15 is a view used to describe another example of positional displacement of the permanent magnet of the first embodiment.

FIG. 15 shows states of positional displacement of the permanent magnet 1 and a positional relation between the permanent magnet 1 and the supplemental groove 5 corresponding to FIG. 5. In FIG. 15(a), the cogging torque S'th-order component is not generated, either. In FIG. 15(b), the cogging torque S'th-order components in a region having a length L4 (region in which the supplemental groove 5 is provided) and in a region having a length L5 (region in which the supplemental groove 5 is not provided) cancel out each other. Hence, the S'th-order component hardly appears in a total cogging torque. This is a case where the position is displaced uniformly in the axial direction.

However, the situation is slightly different in a case where the position is displaced non-uniformly in the direction of the rotation axis as are shown in FIG. 14(c) and FIG. 15(c). Directions of positional displacement indicated by arrows are opposite to each other in a region having a length L1 and a region having a length L3 (regions in which the supplemental groove 5 is not provided) in FIG. 14(d). Accordingly, when averaged out, this is a case substantially the same as the case where no positional displacement occurs. Meanwhile, regarding regions having a length L2 (=L2/2+L2/2) (regions in which the supplemental groove 5 is provided), directions of positional displacement indicated by arrows are opposite to each other in the upper half having a length of L2/2 and the lower half having a length of L2/2. Accordingly, when averaged out, this is also a case substantially the same as the case where no positional displacement occurs. Hence, because the cancelling effect of the cogging torque S'th-order components can be achieved sufficiently, the S'th-order component hardly appears in a total cogging torque.

On the contrary, directions of positional displacement in a region having a length L4 and in a region having a length L5 in FIG. 15(d) are opposite. Accordingly, the cancelling effect of the cogging torque S'th-order components becomes smaller than in the case of FIG. 14. Hence, the S'th-order component in a total cogging torque is increased in comparison with the case of FIG. 14.

In view of the foregoing, the configuration of FIG. 4 has an advantage that the effect of reducing the cogging torque S'th-order component can be exerted sufficiently even in a case where the positional displacement of the permanent magnet 1 is not uniform in the axial direction. The above has described the positional displacement of the permanent magnet 1 alone. It should be appreciated, however, that the same advantage can be achieved even in a case where a variation in shape is inhomogeneous in the axial direction and the magnetic characteristic is inhomogeneous in the axial direction.

As a measure for a cogging torque reduction in the related art, there is a configuration so-called step-wise skew by which one magnetic pole is formed by aligning two or more segment permanent magnets side by side and skewing the segment permanent magnets step-wise in the axial direction. The step-wise skew configuration is disadvantageous over a case where one magnetic pole is formed of one segment permanent magnet in that skewing reduces a torque and increases the number of parts. On the other hand, in the configuration of the permanent magnet rotating electrical machine in the related art, the step-wise skew structure is advantageous in terms of a cogging torque because of the capability of cancelling an influence of permeance pulsations by the slots.

However, according to the configuration of the invention, as has been described above, the effect of reducing the cogging torque S'th-order component can be exerted sufficiently in the configuration of the rotor in which one magnetic pole is formed of one segment permanent magnet even when the positional displacement of the permanent magnet is not uniform in the axial direction, when a variation in shape is inhomogeneous in the axial direction, or when the magnetic characteristic is inhomogeneous in the axial direction. Also, there is another advantage that a reduction of a torque and an increase of the number of parts caused by skewing can be overcome.

Patent Documents 1, 2, and 3 describe cases where two or more than two supplemental grooves 5 are provided to each tooth 7. In contrast, one supplemental groove 5 is provided to each tooth in this embodiment. The S'th-order component of permeance pulsations by the slots in the stator is considerably involved in the cogging torque S'th-order component generated by variations at the end of the rotor. However, by providing one supplemental groove 5, there can be achieved an advantage that it becomes easier to change an amplitude and phases of the S'th-order component of the permeance pulsations.

In addition, an average gap length becomes shorter as the number of the grooves 5 becomes smaller. Hence, when one supplemental groove 5 alone is provided only in a portion in the axial direction, there can be achieved an advantage that a reduction of a torque can be suppressed to a minimum limit under load.

The supplemental grooves 5 of this embodiment are of a shape obtained by cutting out an iron core in a square shape. It should be appreciated, however, that the supplemental grooves 5 are not limited to this shape. It goes without saying that the same advantages can be achieved even when the supplemental grooves 5 are of a shape obtained by cutting out an iron core in a circular arc shape or in a triangular shape.

As has been described, according to the invention, a permanent magnet rotating electrical machine includes a rotor having a rotor core and plural magnetic poles formed of permanent magnets provided to the rotor core, and a stator having plural teeth opposing the plural magnetic poles, a stator core provided with slots in which to store an armature winding wire wound around the teeth, and supplemental grooves provided to the teeth in portions opposing the rotor in an axial direction of the stator core. The permanent magnet rotating electrical machine is configured in such a manner that the supplemental grooves are provided to the stator in a part in the axial direction of the stator core, and that let P be the number of the magnetic poles (the number of poles) and S be the number of the slots (the number of slots), then a relation, $0.75 < S/P < 1.5$, is established. By configuring in this manner, there can be achieved a significant advantage that it becomes possible to markedly reduce a cogging torque generated by variations at the end of the rotor, such as an error in attachment position, an error in shape, and a variation in magnetic characteristic of the permanent magnets.

The above has described a case where one supplemental groove 5 is provided to each tooth in the permanent magnet rotating electrical machine having 10 poles and 12 slots. This case will be described generally as follows. In a permanent magnet rotating electrical machine including a stator having a stator core provided with S slots and the supplemental grooves 5 provided to teeth of the stator core in portions opposing the rotor, a portion in which the supplemental grooves 5 are provided at m points per tooth in a circumferential direction and a portion in which the supplemental grooves 5 are provided at n points per tooth in the circumferential direction are present in an axial direction, and further a phase of a cogging torque S'th-order component in the portion in which the supplemental grooves 5 are provided at m points and a phase of the supplemental S'th-order component in the portion in which the supplemental grooves 5 are provided at n points are inverted from each other. Herein, m and n are integers different from each other such that m≥0 and n≥0. Also, the term, "cogging torque S'th-order component", referred to herein means a component that pulsates S times per rotation of the rotor.

Owing to this configuration, there can be achieved an advantage that it becomes possible to markedly reduce a cogging torque generated by variations at the end of the rotor, such as an error in attachment position, an error in shape, and a variation in magnetic characteristic of the permanent magnets.

Second Embodiment

The first embodiment above has described an example of the permanent magnet rotating electrical machine having 10 poles and 12 slots. It should be appreciated, however, that the invention is not limited to this example.

Let P be the number of poles and S be the number of slots in the permanent magnet rotating electrical machine, then it is known that a winding factor is higher in a case of the combination satisfying a relation, $0.75<S/P<1.5$ than in cases where $S/P=0.75$ and $S/P=1.5$ as described in Patent Documents 1, 2, and 3, so that a compact high-torque permanent magnet rotating electrical machine can be obtained by efficiently utilizing a magnetic flux of the permanent magnets. Further, because the least common multiple of the number of poles and the number of slots is large, it is also known that a cogging torque component that pulsates as many times as the least common multiple of the number of poles and the number of slots per rotation of the rotor is smaller than in cases where $S/P=0.75$ and $S/P=1.5$.

On the other hand, there are problems that a cogging torque S'th-order component generated by variations at the end of the rotor, such as an error in attachment position, an error in shape, and a variation in magnetic characteristic of the permanent magnets, is large and robustness against variations at the end of the rotor becomes low. Hence, it is necessary to solve these problems for a permanent magnet rotating electrical machine mass-produced as the one incorporated into an electrical power steering apparatus.

Figure 16:
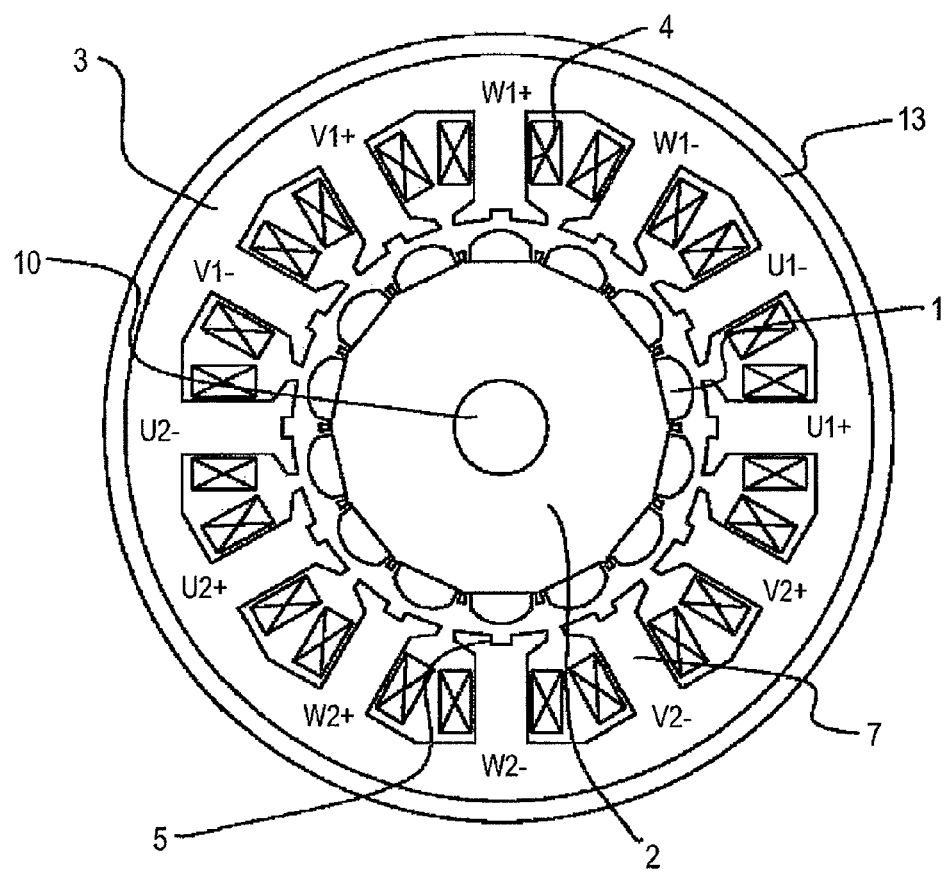
FIG. 16 is a cross section of a permanent magnet rotating electrical machine according to a second embodiment of the invention.
Figure 17:
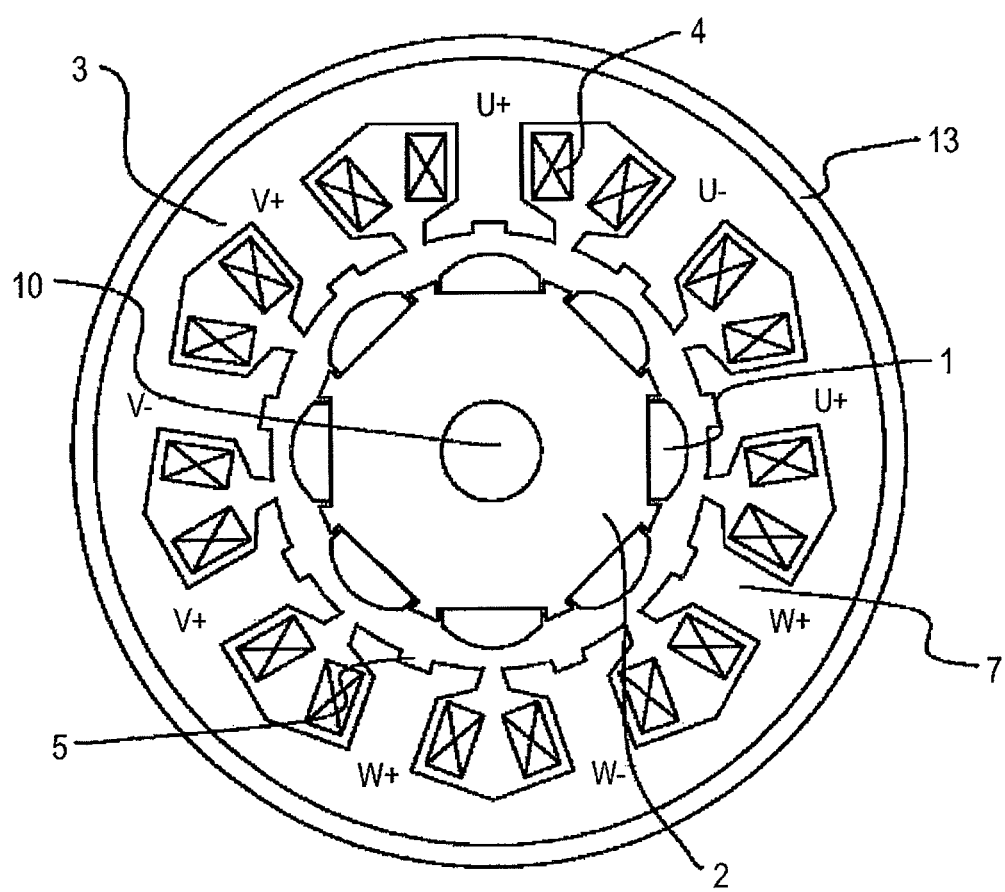
FIG. 17 is a cross section of another example of the permanent magnet rotating electrical machine of the second embodiment.
Figure 18:
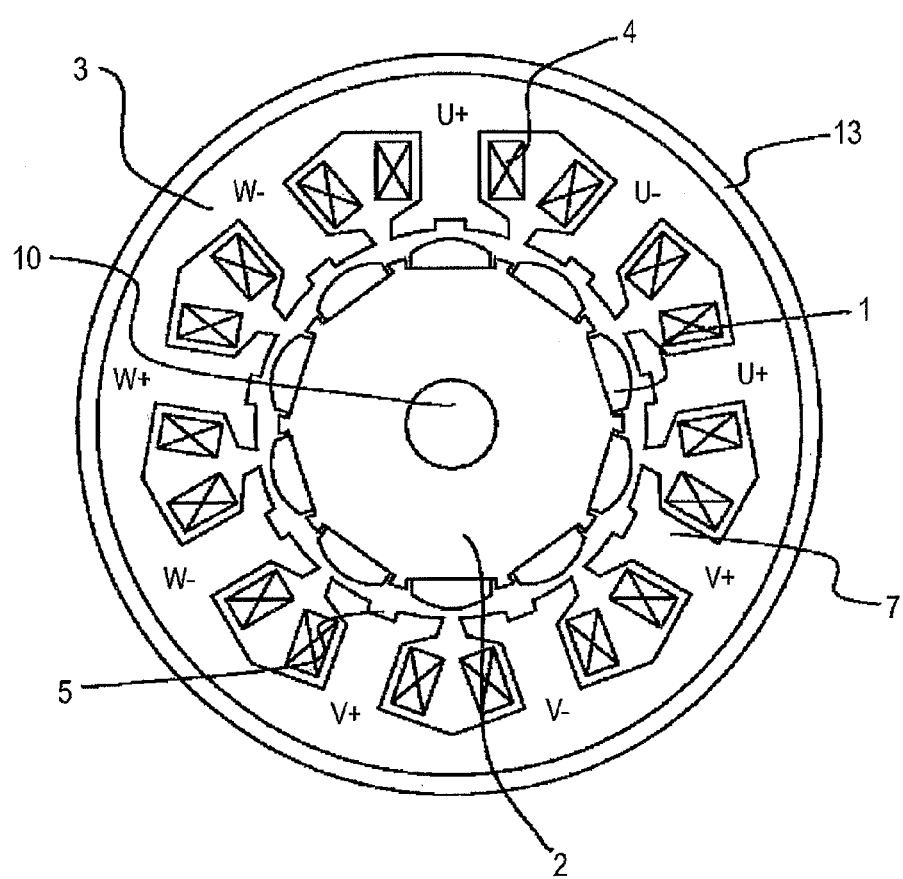
FIG. 18 is a cross section of still another example of the permanent magnet rotating electrical machine of the second embodiment.

FIG. 16 shows a permanent magnet rotating electrical machine that satisfies $0.75<S/P<1.5$ in a case where P=14, and S=12, FIG. 17 shows the one in a case where P=8 and S=9, and FIG. 18 shows the one in a case where P=10 and S=9. In each case, one supplemental groove 5 is provided to each tooth.

FIGS. 16, 17, and 18 are cross sections and each is a cross section in a portion in which the supplemental grooves 5 are provided. As in the first embodiment above, there is a portion in which the supplemental grooves 5 are not provided depending on a position in the axial direction and such a portion is omitted in the drawings.

When configured as above, it becomes possible to achieve both of an advantage that a high torque is obtained while a size is reduced owing to a high winding factor and an advantage that robustness against variations at the end of the rotor becomes higher.

Also, the same advantages can be achieved with a combination of an integral multiple of the number of poles and an integral multiple of the number of slots. Hence, when expressed generally including the combination of the number of poles, P=10 and the number of slots, S=12, the same advantages can be achieved with a combination of the number of poles, P=12N±2N, and the number of slots, S=12N, and a combination of the number of poles, P=9N±N, and the number of slots, S=9N, where N is a natural number.

Third Embodiment

Figure 19:
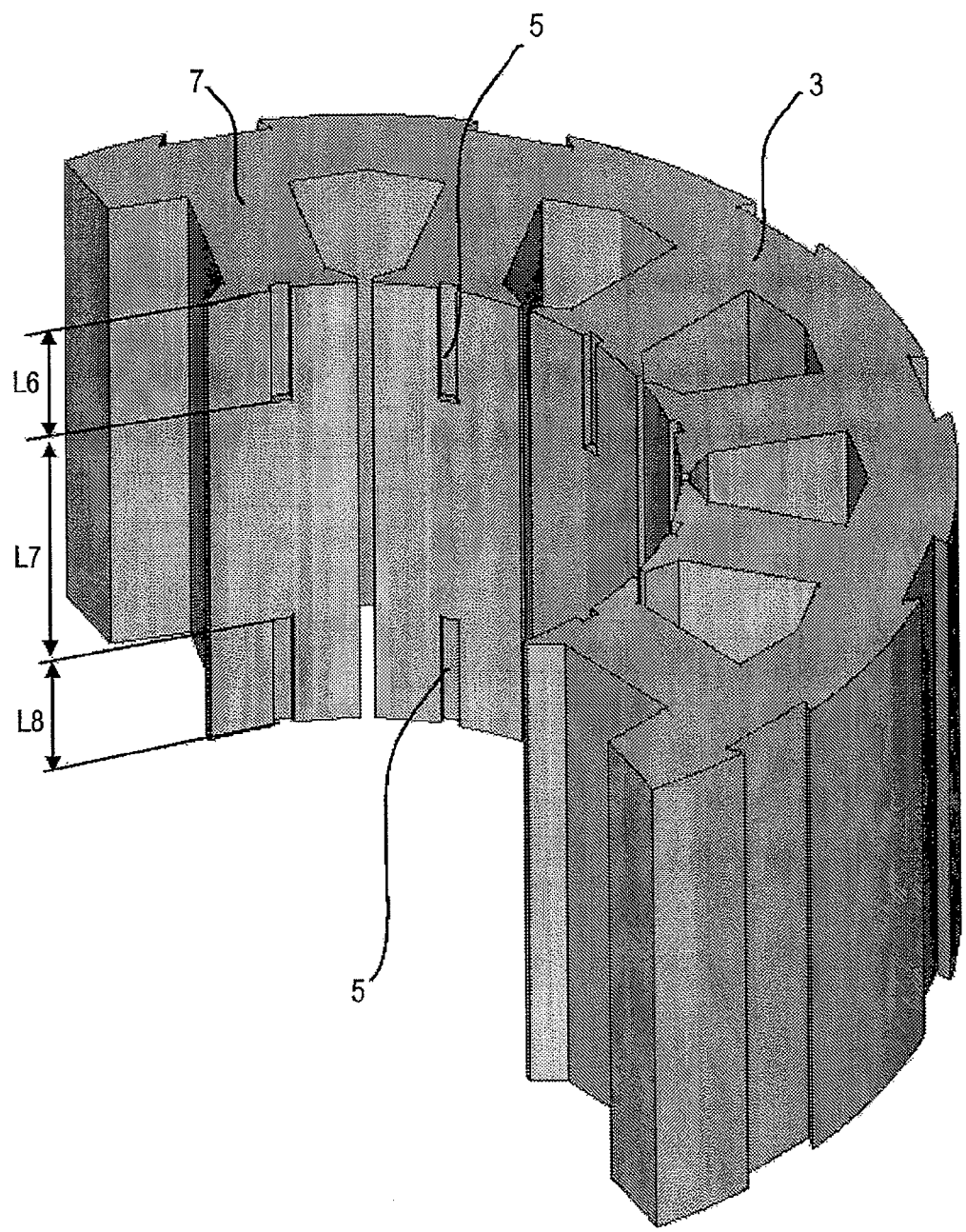
FIG. 19 is a partial perspective view of a stator core of a permanent magnet rotating electrical machine according to a third embodiment of the invention.

FIG. 19 is a partial perspective view in a case where the supplemental grooves 5 are provided to the stator core 3 in the axial end portions and the supplemental grooves 5 are not provided at the axial center portion. Herein, only one half, that is, six teeth 7 out of the 12 teeth 7 provided to the stator core 3 are shown for better view of locations of the supplemental grooves 5 and the rest is omitted. Also, components other than the stator core are omitted.

To describe the locations of the supplemental grooves 5 in detail, the supplemental groove 5 is provided in a portion having a length L6 from the end portion (top in FIG. 19) in the direction of the rotation axis and there is a range in which the supplemental groove 5 is not provided across a portion below having a length L7. Further, the supplemental groove 5 is provided in a portion below having a length L8. When configured in this manner, it also becomes possible to achieve the advantages same as those achieved with the configuration in FIG. 4 of the first embodiment above.

More specifically, it becomes possible to markedly suppress the cogging torque S'th-order component generated at the occurrence of variations at the end of the rotor in comparison with the related art. Also, there is an advantage that the effect of reducing the cogging torque S'th-order component can be exerted sufficiently even in a case where the positional displacement of the permanent magnet 1 is not uniform in the axial direction.

The above has described only the positional displacement of the permanent magnet 1. It goes without saying, however, that the same advantages can be achieved even in a case where a variation in shape is inhomogeneous in the axial direction or in a case where the magnetic characteristic is inhomogeneous in the axial direction.

Fourth Embodiment

Figure 20:
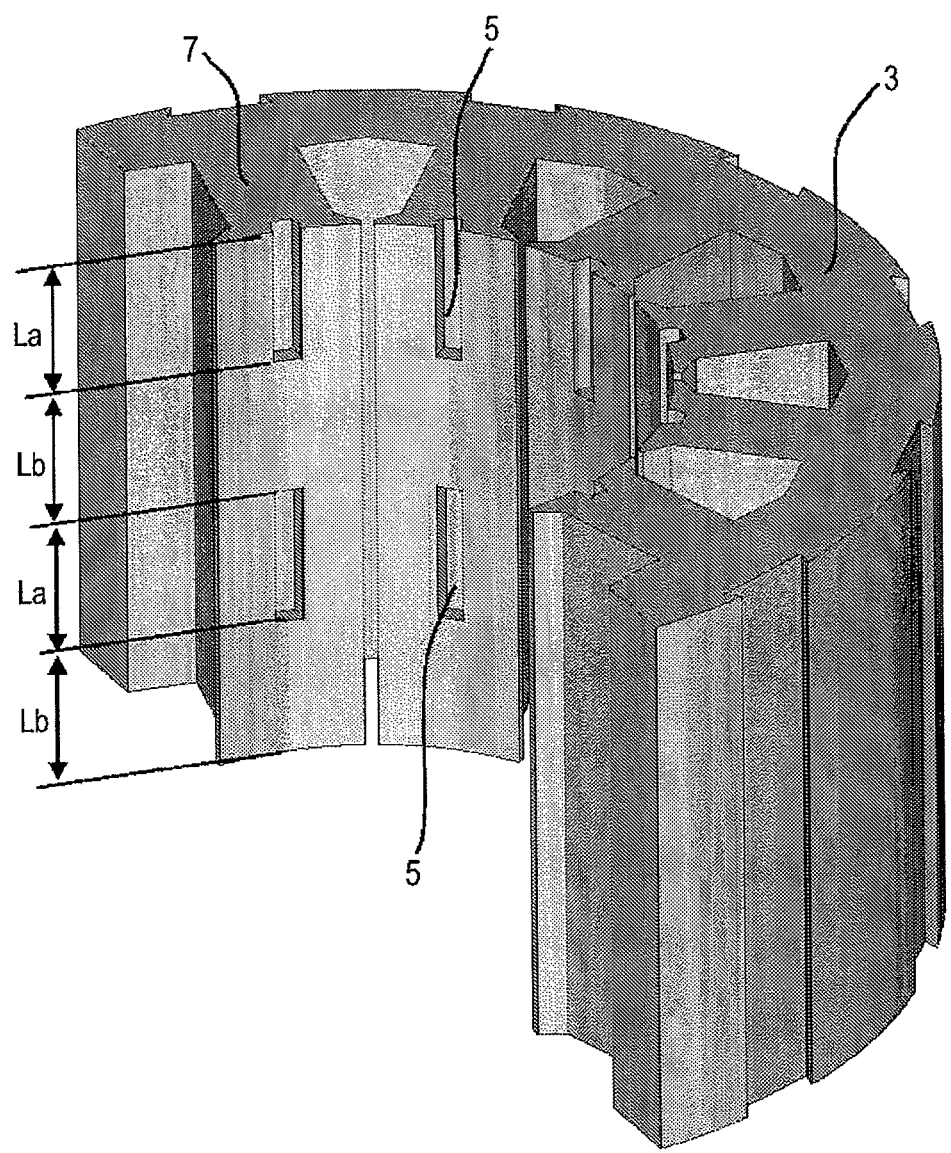
FIG. 20 is a partial perspective view of a stator core of a permanent magnet rotating electrical machine according to a fourth embodiment of the invention.

FIG. 20 is a partial perspective view of the stator core 3 of a fourth embodiment. A portion in which the supplemental groove 5 is provided and a portion in which the supplemental groove 5 is not provided are disposed alternately. The supplemental groove 5 is provided in a portion having an axial length La and there is no supplemental groove 5 in a portion below having an axial length Lb. Further, the supplemental groove 5 is provided in a portion below having an axial length La and there is no supplemental groove 5 in a portion below having an axial length Lb. In short, it is configured in such a manner that supplemental grooves 5 are present and absent in the axial direction in a total of four layers.

Even when configured in this manner, as has been described in the first embodiment above, there can be achieved an advantage that the cancelling effect of the cogging torque S'th-order components in the layers in which the supplemental grooves 5 are provided and in the layers in which there are no supplemental grooves 5 can be exerted sufficiently even in a case where the positional displacement of the permanent magnet 1 is inhomogeneous in the axial direction or a variation in shape is inhomogeneous in the axial direction.

Figure 21A:
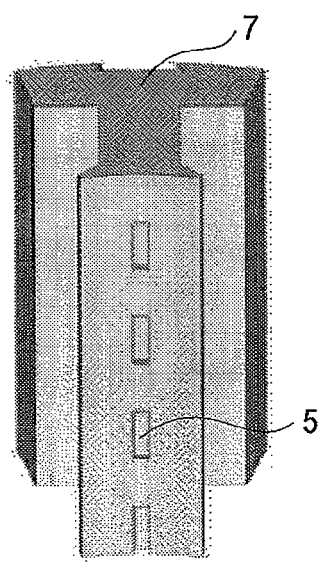
FIG. 21 is a partial perspective view of one tooth of the stator core of the fourth embodiment.
Figure 21B:
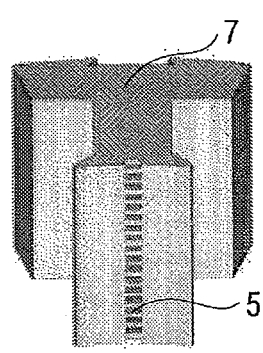
Figure 21C:
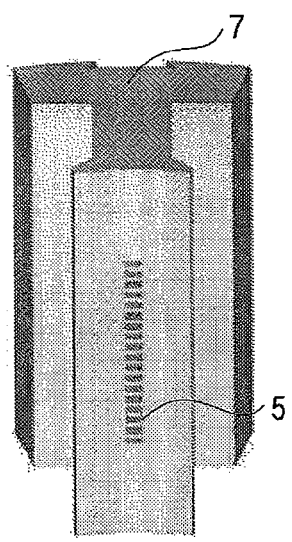

FIG. 20 shows the configuration having four layers. It should be appreciated, however, that the invention is not limited to this configuration and the same advantage can be achieved even in the case of a structure having M layers (M is an integer equal to or larger than 2). For example, the structure may have eight layers as is shown in FIG. 21(a). FIG. 21(b) shows a case where axial lengths of the stator core 3 are different. However, the same advantages can be achieved even when the structure has 35 layers. FIG. 21(c) shows a configuration in which a portion in which the supplemental groove 5 is present and a portion in which the supplemental groove 5 is absent are provided alternately to the stator core 3 in the axial center portion and the supplemental grooves 5 are not provided in the axial end portions. The same advantage can be achieved with this configuration, too.

Figure 22:
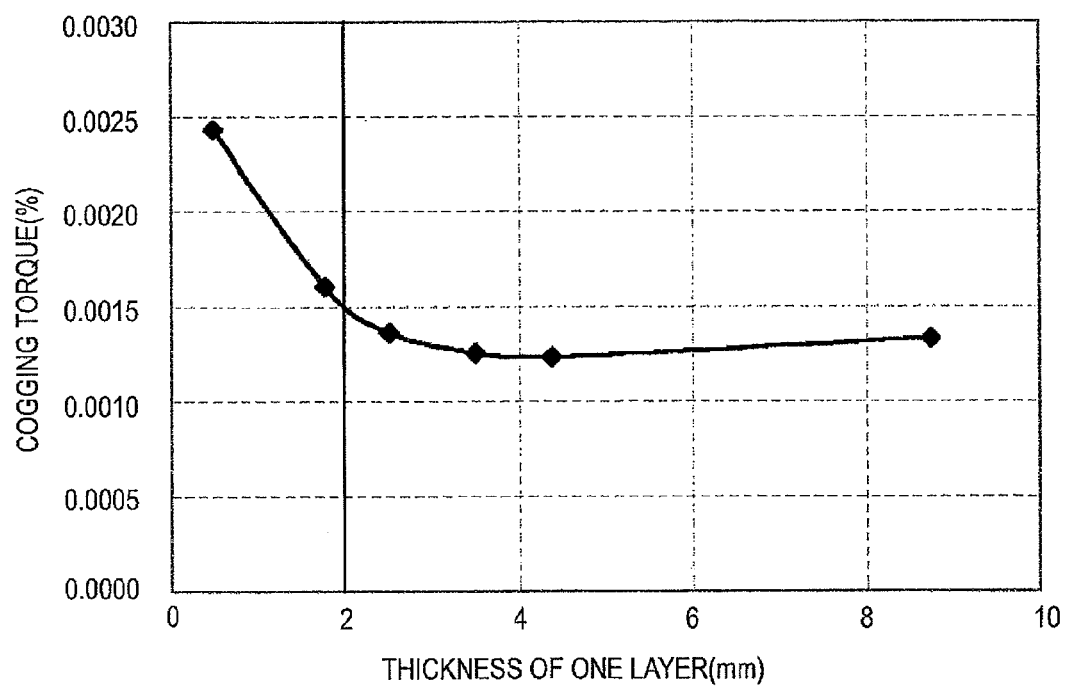
FIG. 22 is a view used to describe a cogging torque of the fourth embodiment.

FIG. 22 is a plotted chart using the abscissa for a thickness of one layer and the ordinate for a cogging torque at the occurrence of variations at the end of the rotor. It is understood from this chart that a significant advantage of a cogging torque reduction can be achieved when the thickness of one layer exceeds 2 mm. Hence, let Lc be an axial length of the stator core 3 and M be a sum of the number of layers in which the supplemental grooves 5 are present and layers in which the supplemental grooves 5 are absent, then there can be achieved an effect of markedly reducing a cogging torque at the occurrence of variations at the end of the rotor when Lc/M≥2 mm is given. Further, it goes without saying that, under the principle same as the principle described in detail in the first embodiment above, there can be achieved an effect of reducing the cogging torque S'th-order component even in a case where variations, such as displacement of the attachment position of the permanent magnet 1, are not uniform in the axial direction.

Fifth Embodiment

The embodiments above have described examples of a surface-mounted magnet type formed by providing the permanent magnets 1 on the surface of the rotor core 3. Applications of the invention, however, are not limited to this type.

Figure 23:
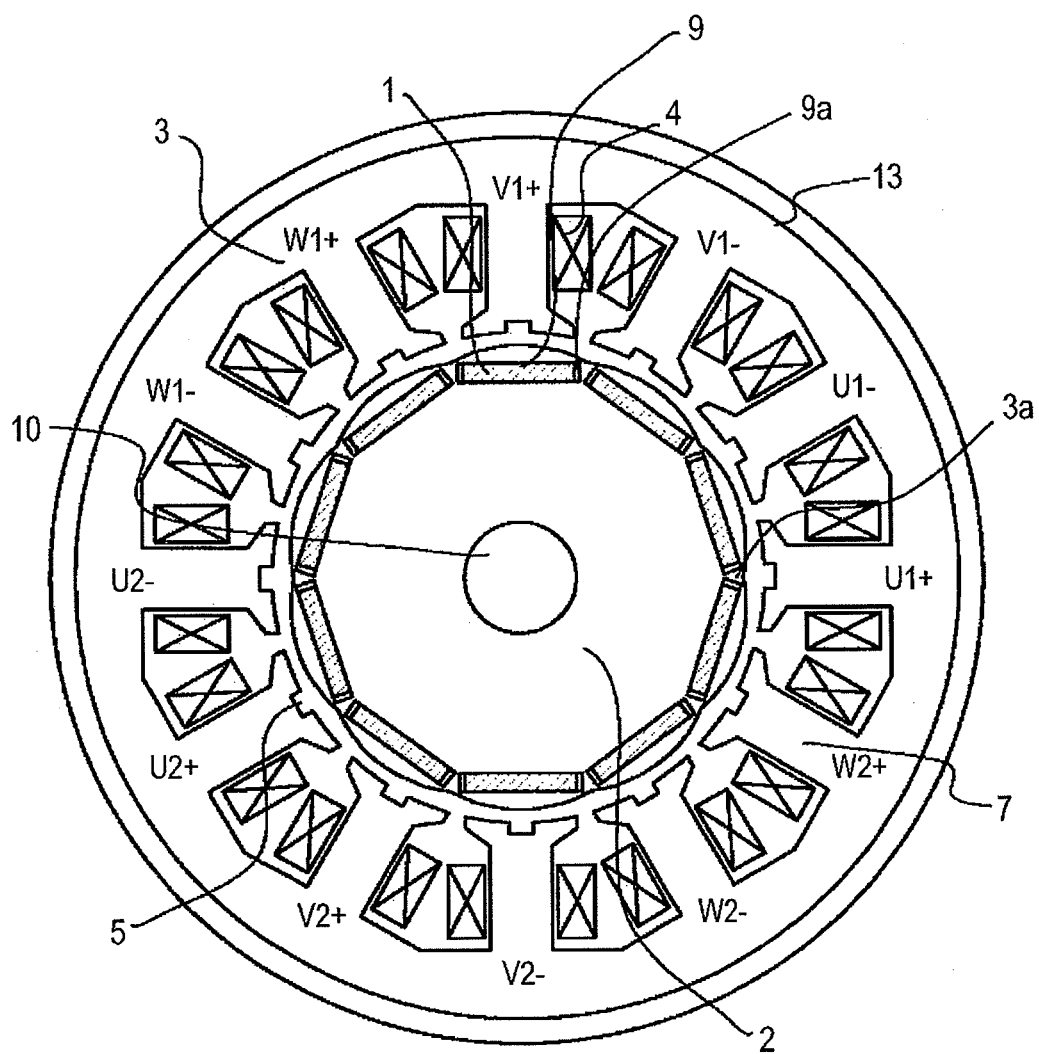
FIG. 23 is a cross section of a permanent magnet rotating electrical machine according to a fifth embodiment of the invention.

FIG. 23 shows an interior-mounted magnet structure in which the permanent magnets 1 are embedded into windows 9 provided inside the rotor core. When configured in this manner, a cogging torque is not increased markedly even at the occurrence of positional displacement of the permanent magnets 1 in the windows 9 provided to the rotor core 2. In short, it becomes possible to provide high robustness against variations at the end of the rotor and to lessen a cogging torque S'th-order component.

Further, in a case where the windows 9 in the rotor core 2 are designed to have a shape large in the left-right direction of the permanent magnets 1 and clearances 9a are formed on the left and right of the permanent magnets 1 when the permanent magnets 1 are inserted, a flux leakage can be lessened because it becomes possible to narrow magnetic path portions of the rotor core 2 provided between the neighboring permanent magnets 1, that is, core portions 3a between the magnetic poles. Consequently, a compact high-torque rotating electrical machine can be obtained.

It should be noted that the presence of the clearances 9a on the left and right of the permanent magnets 1 gives rise to positional displacement of the permanent magnets 1 and therefore raises a problem that a cogging torque S'th-order component is increased. However, by adopting the configuration provided with the stator core of the invention, there can be achieved an advantage that high robustness is provided against variations at the end of the rotor and a cogging torque S'th-order component is lessened.

Sixth Embodiment

Figure 24:
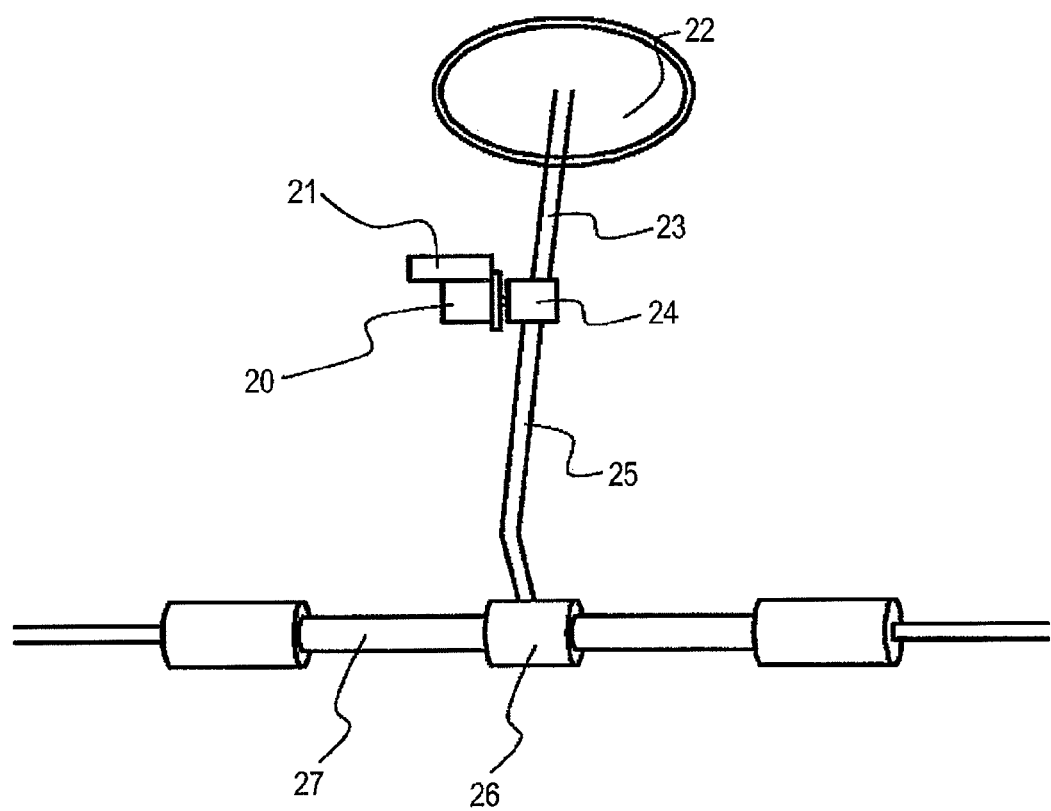
FIG. 24 is a view used to describe an electric power steering apparatus according to a sixth embodiment of the invention.

FIG. 24 is a conceptual view of an electric power steering apparatus for vehicle using the permanent magnet rotating electrical machine of the invention according to a sixth embodiment of the invention.

Referring to FIG. 24, the electric power steering apparatus is provided with a column shaft 23 to transmit a steering force from a steering wheel 22. A worm gear 24 (a detail of which is omitted in the drawing by showing a gear box alone) is connected to the column shaft 23, so that an assist torque is increased by transmitting an output (torque and engine speed) of a motor 20 driven by a controller 21 while changing a rotation direction to be at a right angle and by decelerating at the same time. Numeral 25 denotes a handle joint that transmits a steering force and changes a rotation direction. Numeral 26 denotes a steering gear (a detail of which is omitted in the drawing by showing the gear box alone) that obtains required displacement by decelerating rotations of the column shaft 23 and converting rotational motion to linear motion of a rack 27 at the same time. Wheels are moved by this linear motion of the rack 27 and the vehicle is allowed to turn around.

In the electric power steering apparatus as above, pulsations of a torque generated in the motor 20 are transmitted to the steering wheel 22 via the worm gear 24 and the column shaft 23. Hence, in a case where the motor 20 generates high torque pulsations, the driver cannot have a smooth steering feeling.

However, torque pulsations can be reduced by incorporating the permanent magnet rotating electrical machine of the invention into the electric power steering apparatus of this embodiment as the motor 20. Accordingly, a steering feeling with the electric power steering apparatus can be enhanced. In addition, because motors for electric power steering apparatus are mass-produced, there is a problem that robustness of a cogging torque against variations in manufacturing has to be enhanced. However, by incorporating the permanent magnet rotating electrical machines described in the first through fifth embodiments above, it becomes possible to markedly reduce a cogging torque component resulting from variations in the rotor. Hence, there can be achieved an advantage that robustness is enhanced.

DESCRIPTIONS OF SIGNS AND NUMERAL REFERENCES

1: permanent magnet
2: rotor core
3: stator core
3a: core portion between magnetic poles
4: armature winding wire
5: supplemental groove
6: slot
7: tooth
8: protrusion
9: window
9a: clearance
10: rotation shaft
11a: bearing
11b: bearing
12: housing
13: frame
14: rotation angle sensor 20: motor
21: controller
22: steering wheel
23: column shaft
24: worm gear
25: handle joint
26: steering gear
27: rack

The invention claimed is:

1. A permanent magnet rotating electrical machine, comprising:
   a rotor having a rotor core and a plurality of magnetic poles formed of permanent magnets provided to the rotor core; and
   a stator having a plurality of teeth opposing the plurality of magnetic poles, a stator core provided with slots in which to store an armature winding wire wound around the teeth, and supplemental grooves provided to the teeth in portions opposing the rotor in an axial direction of the stator core,
   the permanent magnet rotating electrical machine being characterized in that:
   the supplemental grooves are provided to the stator so as not to be formed in an axial end portion of the stator core; and
   let P be the number of the magnetic poles (the number of poles) and S be the number of the slots (the number of slots), then a relation, 0.75<S/P<1.5, is established, and let Lc be an axial length of the stator core and Ld be a length of a portion in which the supplemental grooves are provided in the axial direction of the stator core, then Lc and Ld satisfy a relational expression, 0.4≤Ld/Lc≤0.6,
   wherein a phase of a cogging torque S'th-order component generated in the portion in which the supplemental grooves are provided and a phase of a cogging torque S'th-order component generated in the portion in which no supplemental grooves are provided are inverted from each other.

2. The permanent magnet rotating electrical machine according to claim 1, characterized in that:
   the supplemental grooves are provided in an axial center portion of the stator core.

3. The permanent magnet rotating electrical machine according to claim 1, characterized in that:
   the supplemental grooves are provided in an axial center portion of the stator core;
   the supplemental grooves are not provided in an axial end portion of the stator core; and
   the magnetic poles are provided in such a manner that one magnetic pole is formed of one segment permanent magnet.

4. The permanent magnet rotating electrical machine according to claim 1, characterized in that:
   a width of the supplemental grooves is larger than an opening width of the slots.

5. The permanent magnet rotating electrical machine according to claim 1, characterized in that:
   a depth of the supplemental grooves is greater than a thickness at tip ends of the teeth.

6. The permanent magnet rotating electrical machine according to claim 1, characterized in that:
   the supplemental grooves are provided to the teeth in the portions opposing the rotor in a one-to-one correspondence at a center in a circumferential direction of the stator core.

7. The permanent magnet rotating electrical machine according to claim 1, characterized in that:
   the supplemental grooves are located at a plurality of positions in the axial direction of the stator core and circumferential positions of the supplemental grooves coincide with one another in the respective teeth.

8. The permanent magnet rotating electrical machine according to claim 1, characterized in that:
   let N be a natural number, then the number of poles, P, is 12N±2N and the number of slots, S, is 12N.

9. The permanent magnet rotating electrical machine according to claim 1, characterized in that:
   let N be a natural number, then the number of poles, P, is 9N±N and the number of slots, S, is 9N.

10. The permanent magnet rotating electrical machine according to claim 1, characterized in that:
    a portion in which the supplemental grooves are present and a portion in which the supplemental grooves are absent are provided alternately in M layers (M is an integer equal to or larger than 2) in the axial direction of the stator core.

11. The permanent magnet rotating electrical machine according to claim 10, characterized in that:
    let Lc be an axial length of the stator core, then Lc/M 2 mm is given.

12. The permanent magnet rotating electrical machine according to claim 1, characterized in that:
    the permanent magnets are of an interior-mounted magnet structure in which the permanent magnets are embedded in windows provided inside the rotor core.

13. An electric power steering apparatus, characterized by comprising:
    the permanent magnet rotating electrical machine set forth in claim 1; and
    a gear.

* * * * *